(12) United States Patent
Garcia et al.

(10) Patent No.: US 10,356,027 B2
(45) Date of Patent: Jul. 16, 2019

(54) LOCATION RESOLUTION OF SOCIAL MEDIA POSTS

(71) Applicant: HYP3R Inc, San Francisco, CA (US)

(72) Inventors: Carlos Garcia, San Francisco, CA (US); Omar Ramos, Dorado, PR (US); Anton Antonov, Windermere, FL (US)

(73) Assignee: HYP3R INC, San Francisco, CA (US)

( * ) Notice: Subject to any disclaimer, the term of this patent is extended or adjusted under 35 U.S.C. 154(b) by 0 days.

(21) Appl. No.: 15/424,707

(22) Filed: Feb. 3, 2017

(65) Prior Publication Data

US 2018/0097762 A1 Apr. 5, 2018

Related U.S. Application Data

(60) Provisional application No. 62/403,618, filed on Oct. 3, 2016.

(51) Int. Cl.
*H04L 12/58* (2006.01)
*H04L 29/08* (2006.01)
*G06F 16/29* (2019.01)

(52) U.S. Cl.
CPC ............. *H04L 51/20* (2013.01); *G06F 16/29* (2019.01); *H04L 51/32* (2013.01); *H04L 67/18* (2013.01); *H04L 67/306* (2013.01)

(58) Field of Classification Search
CPC ......... H04L 51/20; H04L 51/32; H04L 67/18; H04L 67/306
See application file for complete search history.

(56) References Cited

U.S. PATENT DOCUMENTS 7,289,985 B2 * 10/2007 Zeng ................. G06F 17/30616
707/749
8,352,183 B2 * 1/2013 Thota ................... G06Q 10/107
340/995.14
8,843,528 B1 * 9/2014 Behforooz .......... G06F 17/3053
707/803

(Continued)

OTHER PUBLICATIONS

Corrected Notice of Allowance received for U.S. Appl. No. 15/486,229, dated Sep. 26, 2018, 12 pages.

(Continued)

*Primary Examiner* — Michael Won
(74) *Attorney, Agent, or Firm* — Dentons US LLP

(57) ABSTRACT

The present disclosure relates generally to internet social media, and more specifically to techniques for determining location-related information about internet social media content. In some embodiments, a system accesses data representing a first social media post, the data including geographic location data identifying a first geographic location. The system identifies a second social media post related to the first post. The system accesses data representing the second social media post, wherein the data representing the second post does not include geographic location data identifying the first geographic location. The system analyzes the data representing the second social media post and determines a location score based at least in part on the analysis of the data representing the second social media post. If the location score exceeds a threshold location score, the system associates the second social media post with the first geographic location.

39 Claims, 27 Drawing Sheets

(56) References Cited

U.S. PATENT DOCUMENTS

| | | | |
|---|---|---|---|
| 8,990,194 B2* | 3/2015 | Haugen | H04W 4/08 707/708 |
| 9,361,378 B2* | 6/2016 | Miyasato | |
| 9,373,076 B1* | 6/2016 | Appelman | G06Q 10/10 |
| 9,432,418 B1* | 8/2016 | Mazniker | G06Q 50/01 |
| 9,544,264 B1* | 1/2017 | DeLuca | H04L 51/32 |
| 9,596,207 B1* | 3/2017 | Lin | H04L 51/32 |
| 9,769,624 B1* | 9/2017 | Aharony | H04W 4/023 |
| 10,187,344 B2 | 1/2019 | Garcia et al. | |
| 10,204,264 B1* | 2/2019 | Gallagher | H04N 21/4667 |
| 2009/0019013 A1* | 1/2009 | Tareen | G06F 17/30722 |
| 2012/0323909 A1* | 12/2012 | Behforooz | G06F 16/24578 707/728 |
| 2013/0046826 A1* | 2/2013 | Stanton | G06Q 10/10 709/204 |
| 2013/0204940 A1* | 8/2013 | Kinsel | G06Q 30/02 709/204 |
| 2013/0325948 A1* | 12/2013 | Chen | G06Q 50/01 709/204 |
| 2014/0129625 A1* | 5/2014 | Haugen | H04W 4/08 709/204 |
| 2014/0156749 A1* | 6/2014 | Kanter | G06Q 30/0261 709/204 |
| 2014/0195625 A1* | 7/2014 | Weldon | H04L 51/32 709/206 |
| 2014/0244631 A1* | 8/2014 | Arthur | G06F 17/2785 707/723 |
| 2015/0206169 A1* | 7/2015 | Ye | G06Q 30/0242 705/14.41 |
| 2016/0034712 A1* | 2/2016 | Patton | H04W 4/21 726/28 |
| 2016/0042252 A1* | 2/2016 | Sawhney | G06F 16/50 382/190 |
| 2016/0188702 A1* | 6/2016 | Lee-Goldman | G06F 17/3064 707/749 |
| 2016/0191639 A1* | 6/2016 | Dai | G06Q 30/0255 709/204 |
| 2016/0202879 A1* | 7/2016 | Chen | G06Q 50/01 715/753 |
| 2016/0241652 A1* | 8/2016 | Frazier | H04L 67/18 |
| 2016/0259790 A1* | 9/2016 | Mashiach | G06F 16/9535 |
| 2016/0302030 A1* | 10/2016 | White | H04W 4/02 |
| 2017/0032384 A1* | 2/2017 | Harris | G06Q 30/0201 |
| 2017/0034654 A1* | 2/2017 | Oberbeck | H04W 4/021 |
| 2017/0177589 A1* | 6/2017 | Shorman | H04L 63/101 |
| 2017/0185685 A1 | 6/2017 | Brewer et al. | |
| 2017/0185903 A1* | 6/2017 | Bernhardt | G06N 5/04 |
| 2017/0214752 A1* | 7/2017 | Longo | H04L 67/18 |
| 2017/0250931 A1* | 8/2017 | Ioannou | H04L 51/02 |
| 2018/0060439 A1* | 3/2018 | Kula | G06F 17/30867 |
| 2018/0068019 A1* | 3/2018 | Novikoff | G06F 16/739 |
| 2018/0097763 A1* | 4/2018 | Garcia | H04L 51/20 |
| 2018/0189597 A1* | 7/2018 | Johri | H04L 67/20 |
| 2018/0241713 A1* | 8/2018 | Subba | H04L 51/32 |
| 2018/0285357 A1* | 10/2018 | Chang | G06K 9/00288 |

OTHER PUBLICATIONS

Notice of Allowance received for U.S. Appl. No. 15/486,229, dated Sep. 14, 2018, 15 pages.

* cited by examiner

402

Ally C.
Today at City Arena
What a Beautiful New Arena! Can't Wait to Watch Team Play Tonight!
CityArena   # Gametime   # GoTeam

404

Cindy J.
Today at City Arena
Tip Off! Here We Go!
Gametime   # GoTeam

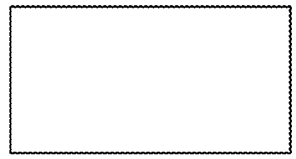

406

Tom R.
Today at City Arena
Our Captain Is Playing Like An All-Star Tonight What a Basket!
Mvp   # Allstar

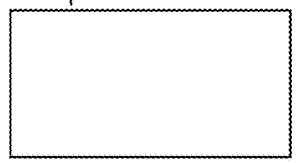

408

Johnny C.
Today at City Arena
Another 3 Pointer! This Must be a Record!
Mvp   # GoTeam   # Playoffs

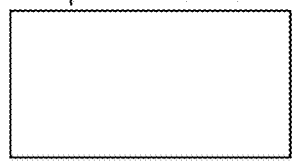

FIG. 4

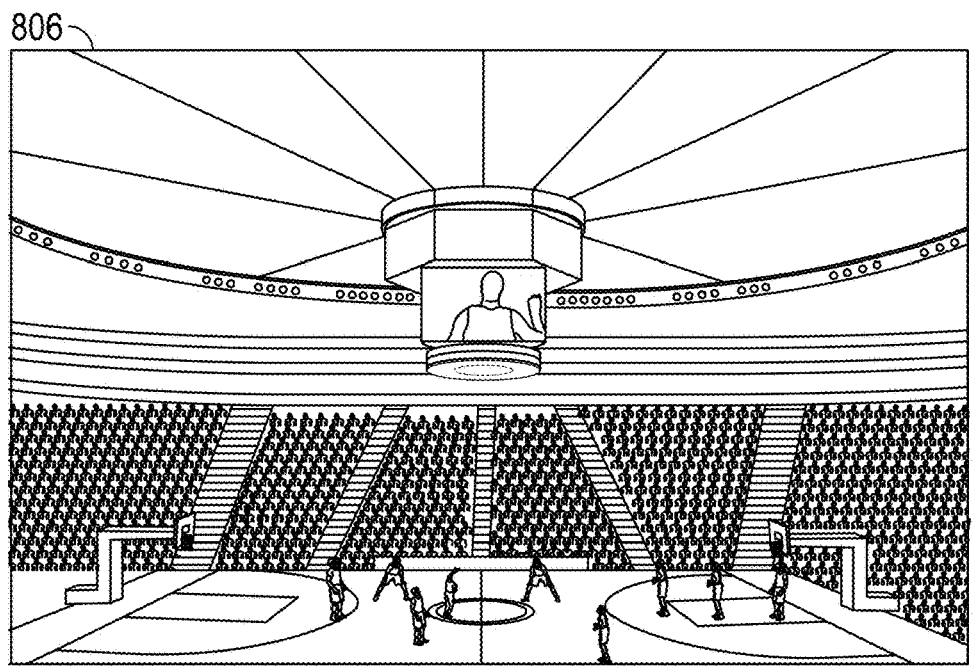
FIG. 8B

| Caribbean & Latin America | Europe | Asia Pacific | Middle East & Africa | United States | Canada |
|---|---|---|---|---|---|
| 1.8 | 2.0 | 1.2 | 1.1 | 1.6 | 0.6 |
| Influence Index (RII) | Influence Index (RII) | Influence Index (RII) | Influence Index (RII) | Influence Index (RII) | Influence Index (RII) |
| 12.5M | 21.3M | 13.8M | 6.5M | 67.8M | 3.2M |
| Total Reach 8.6% | Total Reach 17.5% | Total Reach 17.5% | Total Reach 5.3% | Total Reach 48.2% | Total Reach 2.6% |

2508 ⬉

| Properties A | | Properties B | |
|---|---|---|---|
| | Mentions | | Mentions |
| 1. Love | 216 | 1. Love | 173 |
| 2. Hotel | 167 | 2. ♡ | 160 |
| 3. ♡ | 163 | 2. Hotel | 157 |
| 4. Day | 152 | 4. Night | 141 |
| 5. PropertiesA | 150 | 5. MiamiFestival2018 | 130 |

68 Posts (2.6%)
Related to Day 1 Close

Acquisition Related Keywords:

| | Mentions |
|---|---|
| Hot | 22 |
| PropertiesA | 7 |
| Pool | 2 |
| Concierge | 2 |
| Buy | 2 |

Loyalty Related Keywords

| | Mentions |
|---|---|
| Rewards | 15 |
| Status | 3 |
| Luxury | 3 |
| Portfolio | 1 |
| Upgrade | 1 |

91 Posts (3.5%)
Related to Day 1 Close

Acquisition Related Keywords:

| | Mentions |
|---|---|
| Hot | 18 |
| Buy | 7 |
| PropertiesB | 5 |
| Buying | 2 |
| Gifts | 1 |

Loyalty Related Keywords

| | Mentions |
|---|---|
| Luxury | 34 |
| Status | 23 |
| Rewards | 6 |
| Portfolio | 2 |
| Upgrade | 1 |

FIG. 25C

2510
| Properties A | Properties B |
|---|---|
|  Casino Resort<br>Las Vegas, USA<br>600 posts |  South Beach Hotel<br>Miami Beach, USA<br>1308 posts |
|  Town & Country Resort &<br>Convention Center<br>Nashville, USA<br>562 posts | 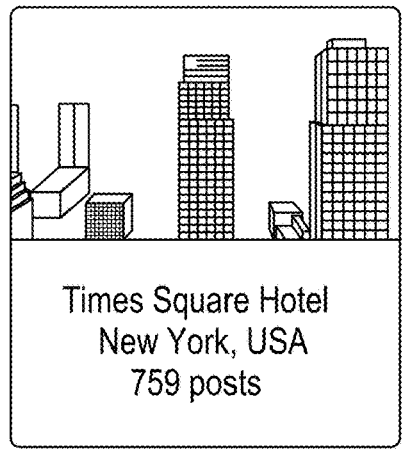 Times Square Hotel<br>New York, USA<br>759 posts |
| 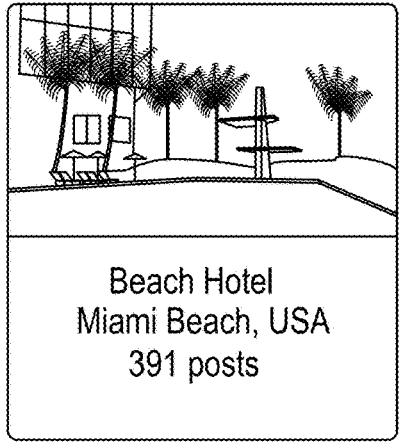 Beach Hotel<br>Miami Beach, USA<br>391 posts |  Downtown Chicago Hotel<br>Chicago, USA<br>504 posts |
FIG. 25D 2512 ↘
Properties A
guycanuck
3.0M
Followers
Luxuryperson
2.3M
Followers
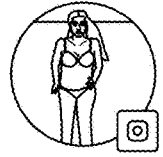
jarast
2.0M
Followers
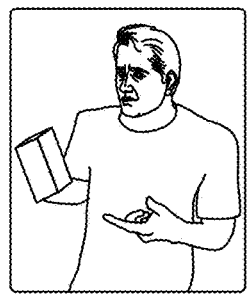
Hotel Panama City
Panama City, USA
Bali Resort
Uluwatu Bali, Indonesia
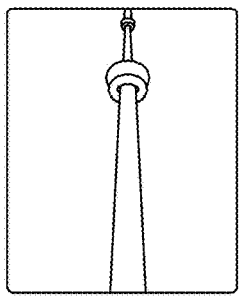
Toronto Hotel
Toronto, Canada
Properties B
xabcqrtx
9.9M
Followers
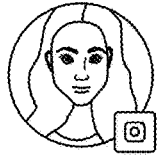
Alessa
6.6M
Followers
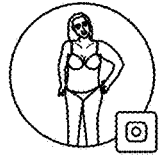
lovely
2.6M
Followers
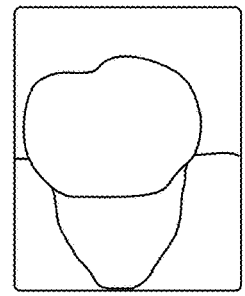
Beijing Hotel
Beijing, China
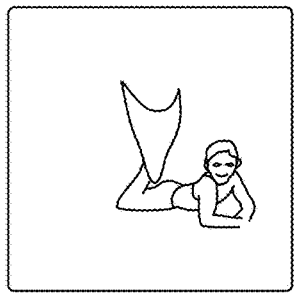
Marina Resort
Mykonos
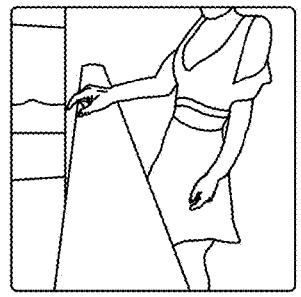
South Beach Hotel
Miami Beach, United States
FIG. 25E

LOCATION RESOLUTION OF SOCIAL MEDIA POSTS

CROSS-REFERENCE TO RELATED APPLICATIONS

This application claims priority to U.S. Provisional Application Ser. No. 62/403,618 filed Oct. 3, 2016 which is incorporated herein by reference in its entirety for all purposes.

FIELD

The present disclosure relates generally to internet social media, and more specifically to techniques for determining location-related information about internet social media content.

BACKGROUND

Social media platforms are becoming an increasingly important way to interact and engage with people, such as customers of a business. Both customers and businesses can benefit from an increase in the number of opportunities to engage through the use of social media. In particular, the benefits of engaging are particularly pronounced when a customer attends an event at the physical, geographic location of a business or event. The ability to recognize the customer's physical presence and engage with the customer in real time, can be used to enhance the customer's experience at the location, and thus is extremely valuable.

However, some techniques for determining the presence of a customer at a physical location using social media are extremely limited in their ability to effectively determine relevant location information, particularly in real time. For example, some existing techniques rely solely on social media posts with geotagged physical locations in order to determine social media activity by customers that are physically present at a location. However, techniques that rely solely on geotagged social media posts can miss the vast majority (e.g., up to about 95%) of social media activity relating to the geographic location of interest.

BRIEF SUMMARY

The present techniques provide methods, computer-readable media, and systems for effectively determining location-related information about internet social media content.

In some embodiments, a computer-implemented method for resolving geographic location of social media posts comprises: accessing, by one or more processors, data representing a first social media post, wherein the data representing the first social media post includes geographic location data identifying a first geographic location; identifying, by one or more processors, a second social media post related to the first social media post; accessing, by one or more processors, data representing the second social media post, wherein the data representing the second social media post does not include geographic location data identifying the first geographic location; analyzing, by one or more processors, the data representing the second social media post; determining, by one or more processors, a location score based at least in part on the analysis of the data representing the second social media post; and if the location score for the data representing the second social media post exceeds a threshold location score, associating the second social media post with the first geographic location.

In some embodiments, a non-transitory computer-readable storage medium stores one or more programs, the one or more programs comprising instructions, which, when executed by one or more processors of a system, cause the system to: access data representing a first social media post, wherein the data representing the first social media post includes geographic location data identifying a first geographic location; identify a second social media post related to the first social media post; access data representing the second social media post, wherein the data representing the second social media post does not include geographic location data identifying the first geographic location; analyze the data representing the second social media post; determine a location score based at least in part on the analysis of the data representing the second social media post; and if the location score for the data representing the second social media post exceeds a threshold location score, associate the second social media post with the first geographic location.

In some embodiments, a system comprises: one or more processors; memory; and one or more programs, wherein the one or more programs are stored in the memory and configured to be executed by the one or more processors, the one or more programs including instructions for: accessing data representing a first social media post, wherein the data representing the first social media post includes geographic location data identifying a first geographic location; identifying a second social media post related to the first social media post; accessing data representing the second social media post, wherein the data representing the second social media post does not include geographic location data identifying the first geographic location; analyzing the data representing the second social media post; determining a location score based at least in part on the analysis of the data representing the second social media post; and if the location score for the data representing the second social media post exceeds a threshold location score, associating the second social media post with the first geographic location.

DESCRIPTION OF THE FIGURES

FIG. 4 depicts exemplary interfaces for displaying social media posts in accordance with some embodiments.

FIGS. 8A-8B depict images associated with social media posts in accordance with some embodiments.

FIGS. 25A-25G depict interfaces for displaying geographic location information associated with social media posts in accordance with some embodiments.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
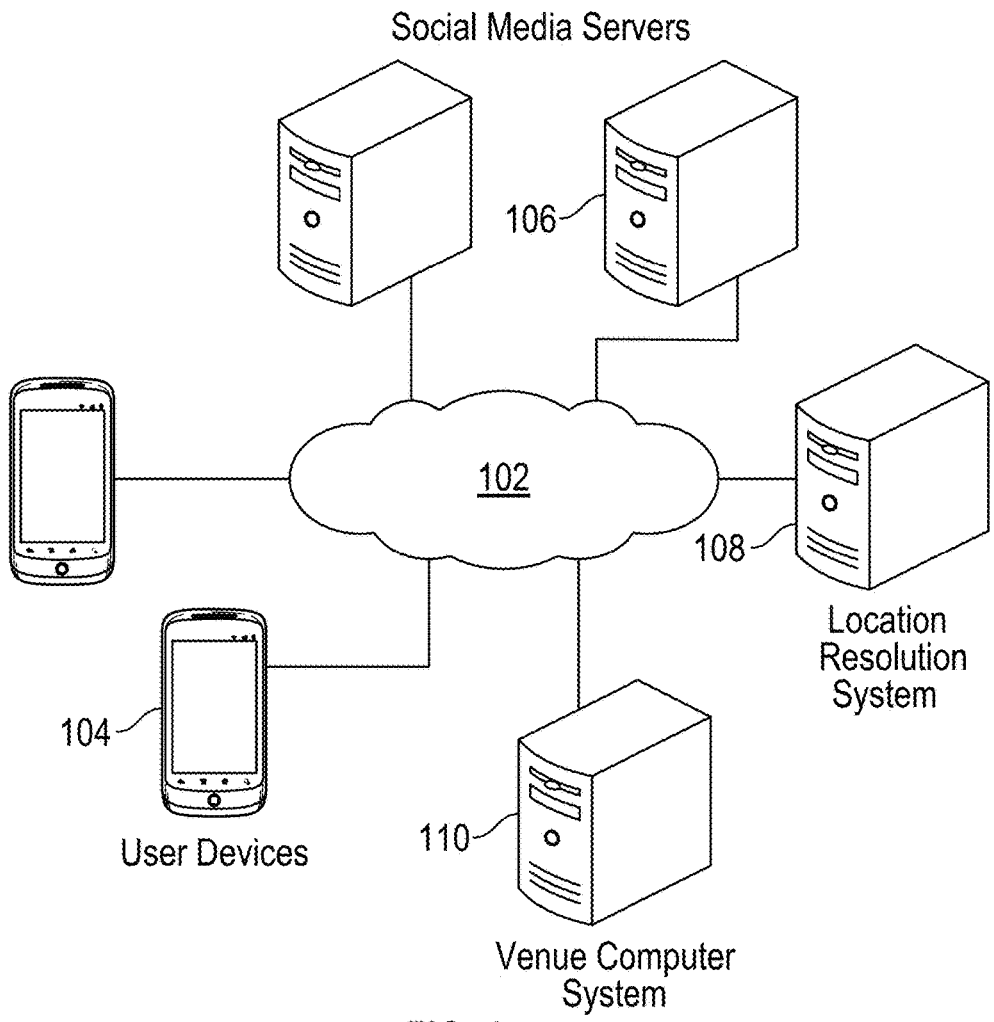
FIG. 1 depicts a network diagram in accordance with some embodiments.

FIG. 1 depicts an exemplary network 100, utilized in accordance with some embodiments. As depicted in FIG. 1, in some examples, user devices 104, social media servers 106, location resolution system 108, and venue computer system 110 are each connected to data network 102. Data network 102, for example, can be any suitable data network for connecting computing devices and/or systems. A data network as used herein is, for example, a wide area network ("WAN") (e.g., the Internet), a local area network ("LAN"), or the like, or some combination thereof. One of skill in the art will readily appreciate that data network 102 is a generalized depiction, and that the data communication channel between devices and systems 104, 106, 108, and 110 can be comprised of one or more interconnected networks.

Figure 2:
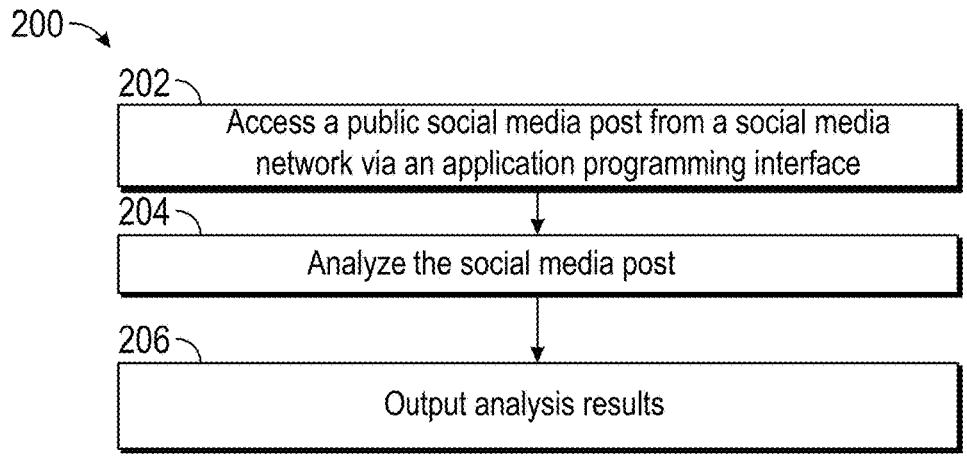
FIG. 2 depicts a flow diagram illustrating an exemplary process for determining, accessing, and analyzing social media posts in accordance with some embodiments.

FIG. 2 depicts a flow chart of an exemplary process 200 for identifying and analyzing a public social media post, in accordance with some embodiments. At box 202, a system (e.g., location resolution system 108 of FIG. 1) accesses a public social media post from a social media network via an application programming interface. For example, with reference to FIG. 1, a user of one of user devices 104 creates, via data network 102, a social media post on a social media network. In this example, the social media platform is represented by social media servers 106, which host the social media network. A social media network can also be referred to as a "social media platform", "social media website", "social media provider", "social media service", "social media message board", or the like. Exemplary social media networks include, for example, well-known networks such as: Facebook (by Facebook, Inc. of Menlo Park, Calif., US), Instagram (by Facebook, Inc. of Menlo Park, Calif., US), and Twitter (by Twitter, Inc. of San Francisco, Calif., US). The phrase "social media network" is not intended to limit the scope of the embodiments described herein, and can also refer to any computerized system or network that can be used to create, share, exchange, and view user-generated content. User-generated and/or user-shared content on a social media network is referred to hereinafter as a "social media post" or simply a "post". In some examples, a social media network utilized in accordance with techniques described herein, has the following characteristics: it allows publically-viewable posts, it allows user accounts to post images and/or video in addition to text, and it makes content accessible via an application programming interface or other method that allows third-party systems to access and process a stream of content from the social media network.

In some embodiments, a system (e.g., location resolution system 108 of FIG. 1) accesses content on a social media network using an application programming interface ("API"). An API, as is well-known in the art, provides an interface standard that allows an application (e.g., executing on location resolution system 108 of FIG. 1) to communicate with and access information from a social media network (e.g., on social media servers 106 of FIG. 1). An API can be unique to a particular social media network, or can be a common API utilized by a plurality of social media networks. The operation of APIs is well understood by those of skill in the art, and thus is not discussed in further detail.

At box 204, the system analyzes the social media post. For example, as will be discussed in further detail below, the system (e.g., location resolution system 108 of FIG. 1) analyzes the content of a social media post to determine a geographic location associated with the post. At box 206, the system outputs the results of the analysis.

1. Initial Data Processing of Social Media Posts Having Known Geographic Locations The techniques described below are useful, for example, for determining a geographic location of a social media post that has not been geotagged. As described above, non-geotagged social media posts account for a large proportion of posts that would otherwise be missed by a business (e.g., an event venue or operator), which represents a lost opportunity to view customer feedback and sentiment, and to engage with customers through social media. On the other hand, by generating this otherwise non-existent location data, more robust and actionable analytic data can be created and used by businesses.

Figure 3:
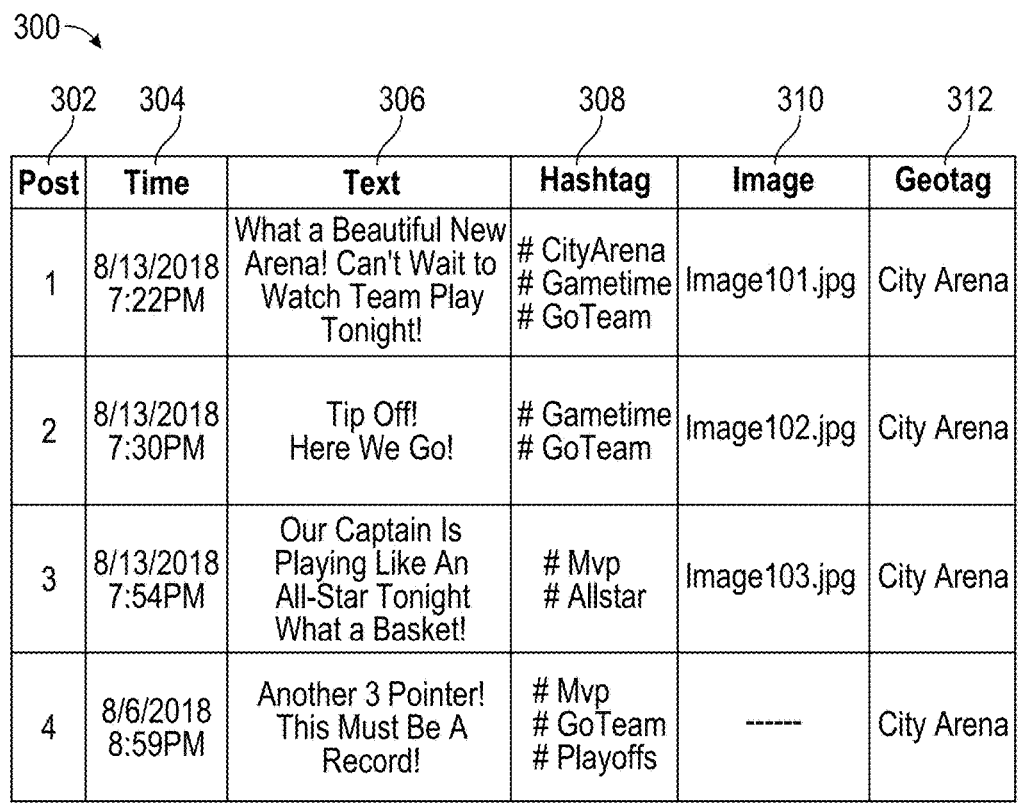
FIG. 3 depicts an exemplary dataset representing a plurality of social media posts in accordance with some embodiments.

Turning to FIG. 3, table 300 (also referred to as dataset 300) depicts data representing a plurality of social media posts that each includes a geotag. A geotag can be a particular location (e.g., venue), latitude and longitude coordinates, or the like. Because the posts of table 300 each include a geotag, they are considered social media posts having a known geographic location, or simply, location. In some embodiments, a social media post without a geotag can have a known location, for example, when such post has been previously analyzed (and location determined), or when user input has provided and/or confirmed the location of the social media post (e.g., user input following visual confirmation by a user that an image depicts the geographic location), or when the location was otherwise previously-associated with the social media post (e.g., contained in metadata of an image), or any other situation in which explicit location data of a social media post is associated with the social media post's data.

In some embodiments, a system in accordance with the techniques described herein accesses, creates, or otherwise uses a dataset of social media posts known to have been posted at a geographic location and/or that depict a geographic location (e.g., are geotagged at a particular venue, or that depicts a venue). As described above, in some embodiments, the dataset includes data from one or more of: geotagged social media posts, and social media posts confirmed (e.g., by analysis or by user input) to have been posted at and/or that depict the geographic location.

Social media posts can typically be represented as several fields of data representing the information from the post. In some embodiments, a dataset representing one or more social media posts includes, for each social media post, one or more of the following fields: text, image/video, and hashtag. In some embodiments, each social media post does not require all three pieces of information to be stored in a dataset. For example, post number 4 in FIG. 3 includes text and hashtags, but does not include an image or image identifier reference. Thus, the appropriate row and column does not include reference to an image associated with the post.

In some embodiments, other data fields can be included in a dataset representing a social media post, including one or more of the following: a user account, a user name, date, time, geotag, information regarding comments/responses for a post (e.g., the text of a comment, an identifier of the user account that posted the comment, and the like), user interactions with the post (e.g., number of "likes", "shares", or other indications that a user account interacted with the post), information about the user device used to create the post, and other appropriate data that can be associated with the social media post.

In some embodiments, the dataset is stored as a database. In this example, the dataset represented by table 300 is stored in one or more database files (e.g., on location resolution system 108 of FIG. 1). A dataset can be stored in any appropriate format for storing and accessing data using computer-accessible media, including one or more of the following formats: Extensible Markup Language (XML), comma-separated values (CSV), JavaScript Object Notation (JSON), Structured Query Language (SQL), Hierarchical Data Format (HDF), and plain text. Those of skill in the art will recognize that this list is not exhaustive, and that other data formats can be used instead or in addition to those listed here. As described below, the dataset can be used to create or train classifier processes for determining a location of social media posts that do not include an explicit association with a location.

The data included in a dataset, such as the dataset represented by table 300 of FIG. 3, can be collected from one or more sources. In some embodiments, the data is retrieved from a social media network (e.g., retrieved by location resolution system 108 and/or venue computer system 110 from social media servers 106 of FIG. 1). For example, the venue computing system can interface with social media network servers via an API and retrieve data representing social media posts that are publically-viewable (e.g., viewable by the general public, or any user with an account on a social media network; these are otherwise referred to as "public" posts). Other techniques for retrieving relevant data are contemplated, such as the use of data scraping (e.g., web scraping), or by capturing data via user input. In some embodiments, the social media posts represented by the data are public posts.

Table 300 includes data representing four social media posts (the posts numbered 1 through 4). Table 300 (otherwise referred to as "dataset 300" or "initial dataset 300") includes a post identifier field 302, a time field 304, a text field 306, a hashtag field 308, an image identifier field 310, and a geotag field 312—each of which includes information corresponding to a respective post (where each row in table 300 represents a post). For instance, the data representing post 1 of table 300 includes the following information associated with the post: time and date of the post (Aug. 13, 2018 at 7:22 PM), the text content of the post ("What a beautiful new arena! Can't wait to watch Team play tonight!"), hashtags from the post (#CityArena, #Gametime, and #GoTeam), an identifier for an image included in the post (image101.jpg), and geotag information (geotagged at City Arena). Posts 2 through 4 include the same information fields, each populated by respective content. Notably, post 4 does not include an image, so its respective image identifier field 310 does not contain an image identifier. The data in table 300 can be stored in accordance with the techniques described above.

In some embodiments, the data is stored by venue. For example, data from a single known geographic location (e.g., City Arena, a venue) is stored together as a dataset for that specific venue. In some embodiments, the data is stored by venue type. For example, data from a plurality of venues can be stored together as a dataset for a venue type. For instance, a dataset can include images from several different professional basketball arenas. Because each basketball arena in the dataset has generally similar common features, this dataset can be useful for identifying other basketball arenas.

FIG. 4 depicts exemplary interfaces for displaying the social media posts represented in table 300 of FIG. 3. For example, interface 402 depicts a visual arrangement of the data representing post 1 in table 300 that can be displayed when a user accesses a social media network from a user device, such as a personal computer or a smartphone (e.g., one of user devices 104 of FIG. 1). Similarly, interfaces 404 through 408 depict visual arrangements of posts 2 through 4 of table 300, respectively. The interfaces of FIG. 4 are provided as an illustrative example of a social media posts. However, as one skilled in the art would appreciate, social media posts corresponding to any number of interfaces and/or arrangements are contemplated to be within the scope of the techniques described herein.

Figure 5:
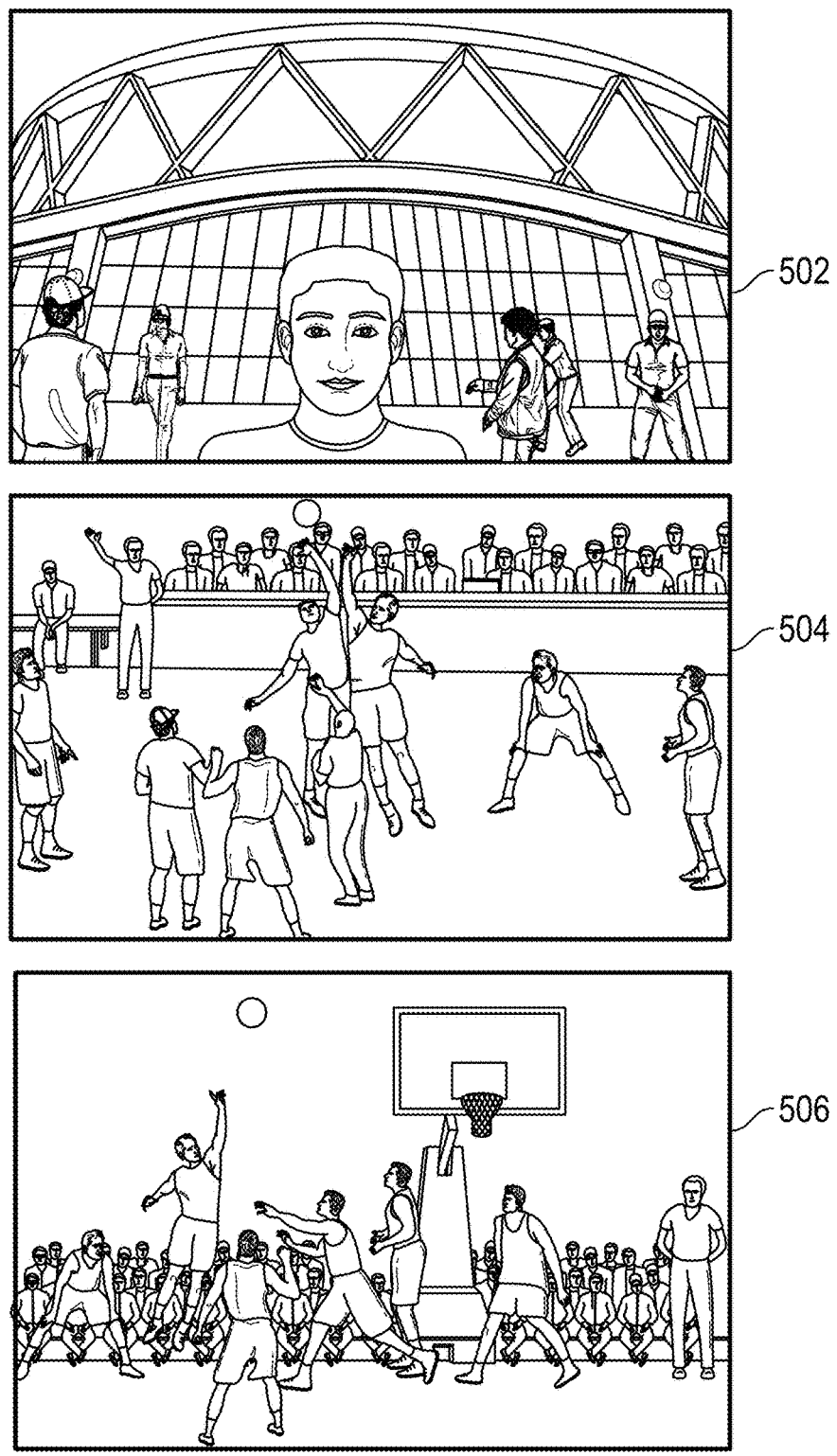
FIG. 5 depicts images associated with social media posts in accordance with some embodiments.

FIG. 5 depicts exemplary images associated with social media posts. In this example, the images 502, 504, and 506 correspond, respectively, to social media posts 1, 2, and 3 of table 300 of FIG. 3. Image 502 corresponds to the image identifier "image101.jpg", image 504 corresponds to the image identifier "image102.jpg", and image 506 corresponds to the image identifier "image103.jpg", each listed in table 300. In the examples depicted, the images were each taken shortly before and during a professional basketball game, taken just outside and inside of a basketball arena venue (e.g., "City Arena").

As explained in greater detail below, a dataset (e.g., dataset 300) that includes information about social media posts (or other relevant information) having a known geographic location can be used to determine a geographic location of social media posts having no known location data.

Figure 6:
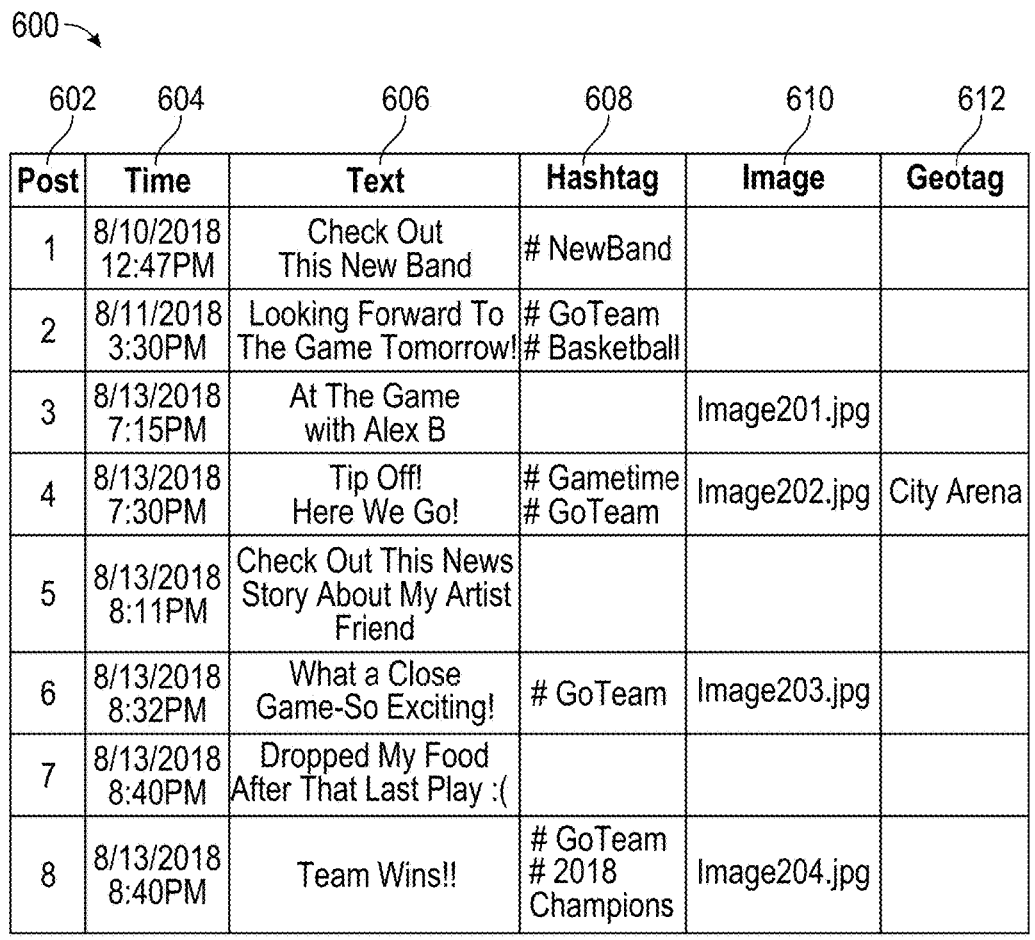
FIG. 6 depicts an exemplary dataset representing a plurality of social media posts in accordance with some embodiments.

Turning to FIG. 6, table 600 depicts data representing a plurality of social media posts, the majority of which do not include a geotag. The posts of table 600 that do not include a geotag (e.g., posts 1 through 3 and posts 5 through 8) are considered social media posts that do not have a known geographic location. Similar to table 300 of FIG. 3, table 600 (otherwise referred to as "dataset 600") includes a post identifier field 602, a time field 604, a text field 606, a hashtag field 608, an image identifier field 610, and a geotag field 612—each of which includes information corresponding to a respective post (where each row in table 600 represents a post). For instance, the data representing post 1 of table 600 includes the following information associated with the post: time and date of the post (Aug. 10, 2018 at 12:47 PM), the text content of the post ("Check out this new band"), and hashtags from the post (#newband), but does not include information in the respective image identifier or geotag fields. Posts 2 through 8 include the same information fields, each populated by respective content. Notably, post 4 includes a geotag (geotagged at City Arena). In this example, post 4 of table 600 corresponds to post 2 from table 300. The data in table 600 can be stored in accordance with the techniques described above. A dataset (e.g., tables 300, 600) can include all of the data described above, less than all of the data described above, or more than the data described above.

In this example, each of the social media posts represented by the rows of table 600 was posted by a single user. The only post that includes a geotag is post 4; the remaining posts do not include a geotag or other explicit identification of location. While it is clear that post 4, based on its associated geotag and time, was posted from the basketball game that began at 7:30 PM at City Arena on Aug. 13, 2018 (e.g., discussed above with reference to FIG. 5), the remaining posts of table 600 also contain potentially valuable information that would otherwise remain undiscovered by merely searching social media based on the geotag "City Arena". For example, posts 2, 3, and 5-8 of table 600 are related to the basketball game, and posts 3 and 5-8 were posted during the basketball game (or otherwise close in time to the game), but do not include a geotag (e.g., "City Arena"). Accordingly, the non-geotagged social media posts 1-3 and 5-8 of table 600 are excellent candidates for location resolution analysis. Techniques for such analysis are described in greater detail below.

Figure 7:
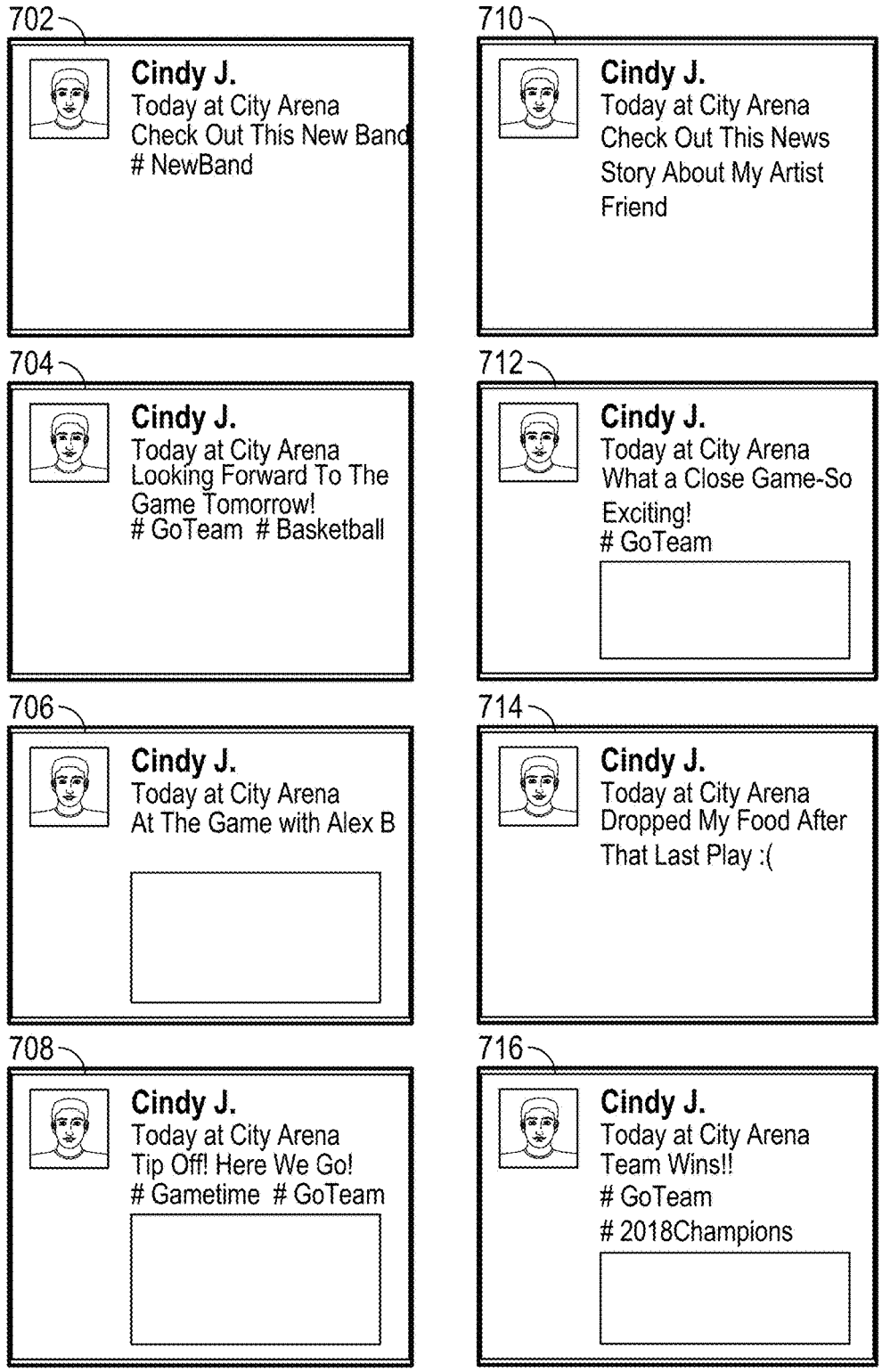
FIG. 7 depicts exemplary interfaces for displaying social media posts in accordance with some embodiments.

FIG. 7 depicts exemplary interfaces for displaying the social media posts represented in table 600 of FIG. 6. For example, interface 702 depicts a visual arrangement of the data representing post 1 in table 600 that can be displayed when a user accesses the social media network from a user device, such as a personal computer or a smartphone (e.g., one of user devices 104 of FIG. 1). Similarly, interfaces 704 through 716 depict visual arrangements of posts 2 through 8 of table 600, respectively. The interfaces of FIG. 7 are provided as an illustrative example of a social media posts. However, as one skilled in the art would appreciate, social media posts corresponding to any number of interfaces and/or arrangements are contemplated to be within the scope of the techniques described herein.

Figure 8A:
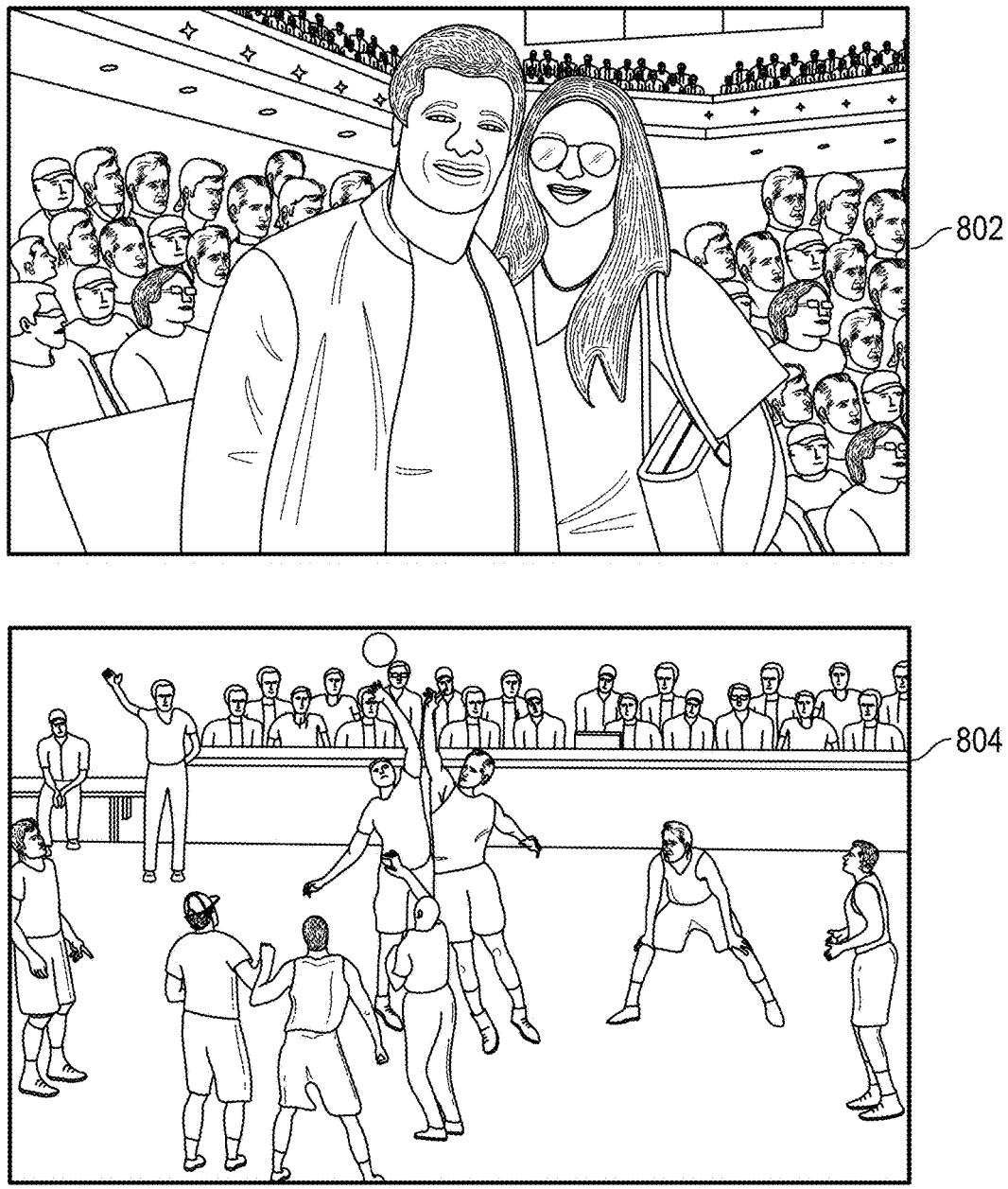

FIGS. 8A-8B depict exemplary images associated with social media posts. In this example, the images 802 and 804 of FIG. 8A, and images 806 and 808 of FIG. 8B correspond, respectively, to social media posts 3, 4, 6, and 8 of table 600 of FIG. 6. Image 802 corresponds to the image identifier "image201.jpg", image 804 corresponds to the image identifier "image202.jpg", image 806 corresponds to the image identifier "image203.jpg", and image 808 corresponds to the image identifier "image204.jpg", each of table 600. In the example depicted, the images were each taken shortly before or during the professional basketball game, and taken just outside or inside of a basketball arena (e.g., "City Arena").

2. Classification and Analysis of Social Media Post Data

Determining a geographic location of a social media post that lacks a geotag or other explicit indication of location in the data representing the social media post can involve analysis of the underlying data representing that post. In some embodiments, the technique includes the use of image classifiers to analyze an image (and/or video) associated with a social media post. In some embodiments, the technique includes the use of semantic analysis of the text and/or hashtags associated with a social media post. In some embodiments, a location resolution system determines a geographic location based on one or more of results of image and semantic analysis. These aspects are discussed below, in turn.

a. Image Classifiers

In some embodiments, if a social media post includes an image, the image is analyzed using one or more image classifier process. In some examples, the image classifiers are computer-implemented processes used to classify an image into one or more "classes" or with one or more "labels". In some embodiments, the classification of an image involves the analysis of the visual content of the image. The analysis of the image can be used to label the image, and determine, based on the label, a geographic location to be associated with the social media post that included the image.

An object that is configured to classify an image or video is referred to as a "classifier" or a "classifier object". In some embodiments, a classifier is a computer-executable program, object, routine, function, process, and/or some other set of computer-executable instructions. The term "image" as used throughout this document refers to either, or both, an image (e.g., a photograph) or a video (e.g., a collection of image frames), unless otherwise noted.

Exemplary techniques and processes for performing image classification in accordance with some embodiments are discussed below.

i. k-Nearest Neighbors Image Classifiers

In some embodiments, an image classifier utilizes a Nearest Neighbors algorithm (also referred to as a "k-Nearest Neighbors algorithm" or "k-NN algorithm"). A k-NN algorithm can be used to classify a target object (e.g., determine a class membership of an image or video) based on the k number of nearest feature vectors in a given feature space of training samples for which classes are known. In some examples, if k is equal to one, then the algorithm can assign (to the target object) the class label of the object whose feature vector is nearest to the feature vector of the target object being classified. In some examples, if k>1, then a majority vote of the k nearest feature vectors can be used to assign a class label to the target object being classified.

Application of a classifier that utilizes a k-NN classification scheme generally involves two processes: "building" the classifier (which can also be referred to as "training" the classifier), and performing classification of target objects using the classifier.

Figure 9:
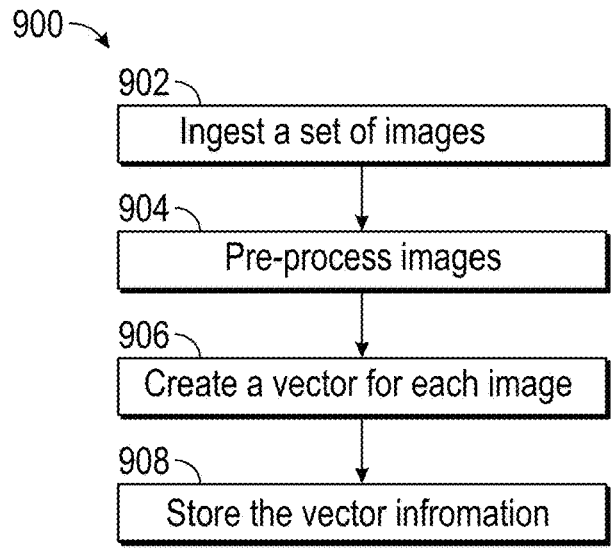
FIG. 9 depicts a flow diagram illustrating an exemplary process for analyzing images associated with social media posts in accordance with some embodiments.

FIG. 9 depicts an exemplary flow diagram of a process 900 for building a classifier that utilizes a k-Nearest Neighbors classification scheme. At block 902, a system ingests a set of images. In some embodiments, ingesting data includes parsing text associated with the data. In some embodiments, ingesting a set of images can include accessing a locally-stored set of images and/or retrieving images from one or more remote locations (e.g., from one or more social media networks via the Internet). For example, the system can access the images (depicted in FIG. 5) of the posts in dataset 300 of FIG. 3, which can be stored with data of dataset 300 or retrieved using an identifier or path in the data of dataset 300 (e.g., an Internet URL, a file directory location). In this example, a classifier built using the images from dataset 300 will result in a useful tool for classifying social media posts of unknown location that include images, because the posts of initial dataset 300 are each geotagged (and thus each image has a known location associated with it).

In some embodiments, the images of the set of images are associated with a set of labels (also referred to as "classes"). For example, the images of a set of images (associated with a known location) can each be labeled (e.g., associated with a label) based on what is visually depicted in the images. Ingesting a set of images can further include determining the number of images in the set of images and the number and identity of any labels associated with each image. For example, if 100 images are ingested, then $n_{images}$=100. If the 100 images include 3 labels, $n_{labels}$=3 (e.g., a set of labels such as {"playfield", "selfie", and "other"}). In this example, the three images of dataset 300 (e.g., shown in FIG. 5) can be considered the first 3 images of the 100 images ingested.

In some embodiments, ingesting a set of images includes retrieving the images and their corresponding labels. For example, the images and their labels can be included in a pre-existing set of data that is retrieved from computer memory.

At block 904, the system pre-processes the set of images. In some embodiments, pre-pre-processing includes converting each image into a predefined shape. For example, the system can convert each image into a 100×100 pixel image. In some embodiments, pre-processing includes adjusting and/or normalizing one or more visual characteristics of images in the set of images. For example, the system can adjust and/or normalize image color, brightness, or the like.

At block 906, the system creates a feature vector. In some embodiments, a feature vector is created for each image in the set of images. A feature vector (or other data structure such as an array) represents an image based on one or more features that characterize the image. Feature vectors can be created which quantitatively express features of images in a way that makes comparison easier. Features useful for the analysis of images can include, but are not limited to: pixel colors, distribution of colors among patches of pixels in the image, image histogram, color histogram, or the like.

In some embodiments, creating a feature vector includes, for each image in the set of images, creating a vector for each channel of the image. For example, for an RGB image (an image whose data includes red, green, and blue color channels), a vector is created by flattening the matrix corresponding to each color channel. In this example, three vectors will be created—a vector for each of the red, green, and blue channels. Thus, each channel vector of a 100×100 pixel RGB image will be 10,000 elements long (representing each pixel in the 100×100 pixel image).

In some embodiments, the channel vectors are concatenated. In this example, the concatenated vector would be 30,000 elements long (10000+10000+10000)—the concatenation of the three RGB color channel vectors. In some embodiments, further processing is performed using the channel vectors and/or the concatenated vector. Further processing can be performed, for example, to determine the feature vectors of each image. Process 1000, described below, illustrates exemplary further processing for determining feature vectors.

At block 908, the system stores the feature vector. For example, once each image has been processed and represented as one or more feature vectors (or arrays), the system stores the feature vector information, which can be used in the analysis of images of unknown class (e.g., by comparing a feature vector of the image of unknown class with the stored data).

Figure 10:
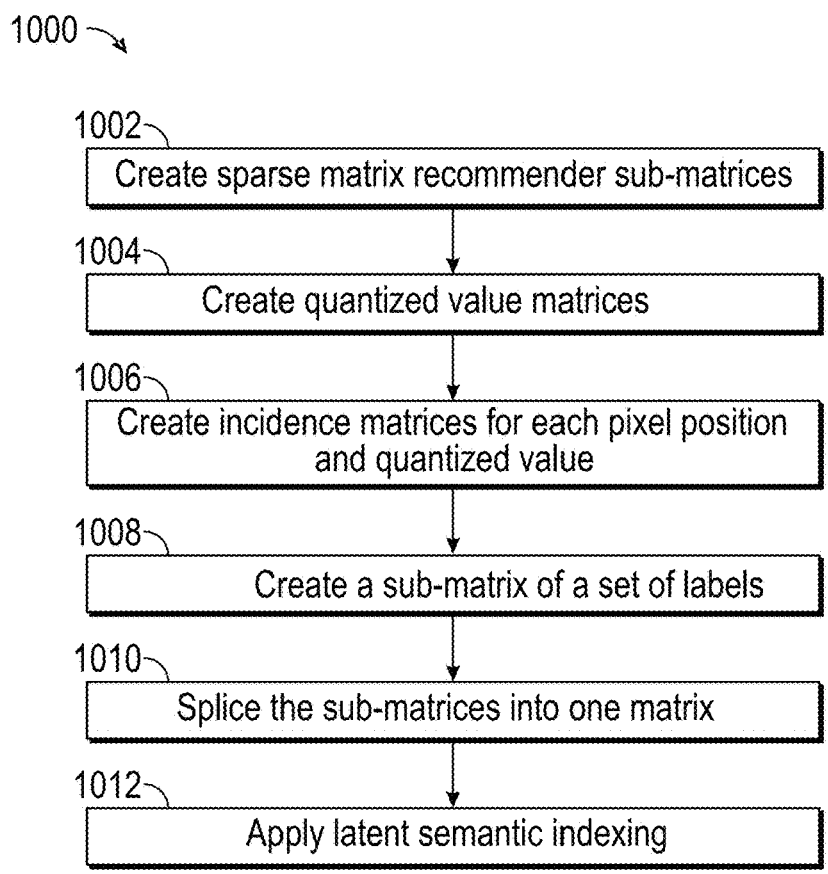
FIG. 10 depicts a flow diagram illustrating an exemplary process for analyzing images associated with social media posts in accordance with some embodiments.

FIG. 10 depicts an exemplary flow diagram of process 1000 for processing image channel vector data. At block 1002, the system creates sparse matrix recommender ("SMR") sub-matrices from vector representations of the images. In some embodiments, the system creates a sub-matrix for each color channel of the image. Depending on the color channels used, these sub-matrices can be referred to as Red-Green-Blue (RGB) matrices, Hue-Saturation-Value (HSV) matrices, or the like. HSV matrices can be used in conjunction with, or instead of, RGB matrices. For example, if each image in the set of images is resized to be 100×100 pixels, the system can create a sub-matrix that includes the red color channel information for all of the images (of the set of images), and that has the dimensions 100×10000 (100 images (rows), each having 10,000 pixels (columns)). Similarly, a sub-matrix for the green pixels with the same dimensions, and a sub-matrix for the blue pixels of the same dimensions can be created.

At block 1004, the system creates quantized value matrices from the sub-matrices. For example, the values of the pixels in each color channel that range from 0 to 255 (e.g., for an 8-bit color channel) are separated into 10 intervals. For instance, the range of values from 0 to 255 is divided into 10 intervals, and a value in the range is represented by one of the 10 intervals (e.g., with the first interval representing the values from 0 to 25, the second interval representing the values from 26-50, and so on). Thus, in this example, a value of 13 would have the quantized value of 1 (e.g., because it belongs to the first interval), and a value of 29 would have a quantized value of 2 (e.g., because it belongs to the second interval).

At block 1006, the system creates incidence matrices for each pixel position and quantized value. For example, this can be explained as unfolding each column into quantized values columns. For instance, if the pixel at position (e.g., column) 125 in the 37th vectorized image (e.g., row) (of the 100 images) has the quantized value of 6, then the system replaces the column 125 with 10 columns and assigns the value of 1 to the 6th column of those new columns. In absolute coordinates this means that the matrix entry (37, 124*10+6) will have the value 1. In other words, the system expands a matrix entry that includes a (single) quantized value into a number of entries equal to the number of quantization intervals (e.g., 10 in this example), where the quantized value is represented by the position of an entry (e.g., non-zero entry). Here, the quantized value of [6] can be represented as [0, 0, 0, 0, 0, 1, 0, 0, 0, 0]. Thus, in the case of 10 quantization intervals, a 100×10,000 color channel sub-matrix would expand to have the dimensions 100×100,000. Each row of the incidence matrix can be used to compute the similarity between images. For example, the more non-zero values in common that two rows have (e.g., each row representing a different image) the more similar the images are. In the example above, the matrix entry (37, 124*10+6) has a value of 1—if the matrix entry (100, 124*10+6) also has the value of 1 this means that the 37th image and 100th image have the same (quantized) color value at the corresponding pixel. The greater the number of pixels that have the same color values, the more similar the images.

At block 1008, the system creates a sub-matrix for a set of labels. In some embodiments, each column corresponds to a label. For example, the set of labels can be {"playfield", "selfie", "other"}. In this example, an image associated with the label "playfield" would depict a basketball court. In other examples, an image labeled "playfield" can depict a playing field, playing surface, court, or other space in which a sporting event is played. Images of the set that are labeled "playfield" can include images of the same playfield or different playfields. In some examples, an image labeled "playfield" can also depict the stadium, venue, and/or building (e.g., with or without including a playing surface). Such images taken at the physical, geographical location of an event, such as a sporting event, tend to indicate that the user is (or was) physically present at the event.

In some embodiments, the resulting sub-matrix for the set of labels has the dimensions $n_{images} \times n_{labels}$, wherein $n_{labels}$ is the number of labels in the set of labels. In this example, the sub-matrix of labels has the dimensions 100×3 (100 rows and 3 columns). Thus, each row corresponds to an image of the set of 100 images, and each column corresponds to a label of the set of 3 labels. For ease of reference, the sub-matrix for the set of labels will be referred to as $M_{lbl}$. In some embodiments, the sub-matrix for the set of labels includes a first value (e.g., "1") at entries that correspond to images that are associated with a label, and a second value (e.g., "0") at entries that correspond to images that are not associated with the label. For example, if the image represented by row 1 of the sub-matrix is labeled "playfield" from the set of labels {"playfield", "selfie", "other"}, the first column of row 1 includes a value of 1, but the second and third columns include a value of 0.

At block 1010, the system splices the sub-matrices into one matrix. For example, the channel sub-matrices are spliced into one matrix. In some examples, the incidence matrices created from the channel sub-matrices are spliced with the label sub-matrix to form a single matrix. In this example, the spliced matrix would have the dimensions 100×300,003. That is, for the set of 100 images (100 rows), with each 100×100 pixel image having 3 color channels (e.g., a red, green, and blue channel) quantized into 10 intervals, and the images categorized according to three labels: (100 pixels)*(100 pixels)*(3 channels)*(10 intervals)+(3 labels)=300,003 columns. For ease of reference, the spliced matrix will be referred to as M. As can be seen, in this example the spliced matrix M includes the label sub-matrix $M_{lbl}$. In some embodiments, a spliced matrix does not include a label matrix. For instance, if the label sub-matrix $M_{lbl}$ is excluded in this example, M would have the dimensions 100×300,000.

At block 1012, the system performs a latent semantic indexing process using the entries of selected sub-matrices. In some embodiments, latent semantic indexing ("LSI") is performed on one or more of the sub-matrices that are included in the spliced matrix M. In some examples, LSI is performed on one or more of the incidence matrices created from the channel sub-matrices. In some embodiments, latent sematic indexing is performed on the sub-matrices of M that are not label sub-matrices (e.g., LSI is performed on the RGB color channel sub-matrices, but not on the label sub-matrix $M_{lbl}$. In some embodiments, LSI is optionally performed. For example, LSI can be performed sometimes, or not at all, to the sub-matrices representing a set of images. Latent semantic indexing is a technique that utilizes statistics about the appearance of matrix values across the matrix columns and rows. For example, the LSI process is used to determine patterns within an individual color channel sub-matrix (e.g., an incidence matrix for the color channel) for images of the set of images that share a label. Thus, the system can determine the latent patterns that are present in the data of images that are known to be labeled, for example, as "playfield". For instance, referring back to FIG. 5, images 504 and 506 each depict the basketball court of the venue City Arena, but from different angles and with different fields of view. Though the images are not identical (or even very similar), because they depict the same subject matter they will have some latent similarities in their visual data (e.g., the pixel coloration). Using an LSI process allows those similarities to be identified and quantified.

In some embodiments, one or more of the following LSI metrics are used: inverse document frequency ("IDF"), global frequency inverse document frequency ("GFIDF"), and term frequency-inverse document frequency ("TF-IDF"). One skilled in the art would appreciate that other LSI metrics not listed here can be used instead of, or in addition to, the aforementioned metrics.

In some embodiments, one or more sub-matrix row is normalized. In some examples, applying LSI includes applying normalization to each sub-matrix row. For example, a cosine normalization function can be applied to each row of a sub-matrix, wherein each row represents a vector. Cosine normalization is applied to each row i of the sub-matrix M using the formula: $(M[i,j])/\text{sqrt}(M[i,1]^2+M[i,2]^2+ \ldots M[i,n_{normal}]^2)$, wherein "sqrt( )" represents the square root of the expression inside the parentheses, wherein M[i,j] is the entry located at row i and column j of matrix M (having m rows and n columns), and wherein $n_{normal}$ is the number of columns (less than or equal to n) to be normalized. For example, if 30,000 columns of M are being normalized, then $n_{normal}$=30000. In some examples, fewer than all of the columns n are normalized (e.g., if M includes n=30,003 columns, $n_{normal}$ can be 30000). One skilled in the art would appreciate that other normalization functions can be used. Normalizing the sub-matrices is an important feature for tuning the classifier being built.

In some embodiments, one or more of the sub-matrix $M_{lbl}$, the matrix M, the normalized sub-matrices, the quantized value matrices, the incidence matrices, and the results of the latent semantic indexing are stored in computer memory. In some embodiments, one or more of these matrices are stored as an object in computer memory. This can be referred to as an "SMR object" or a "classifier object".

Figure 11:
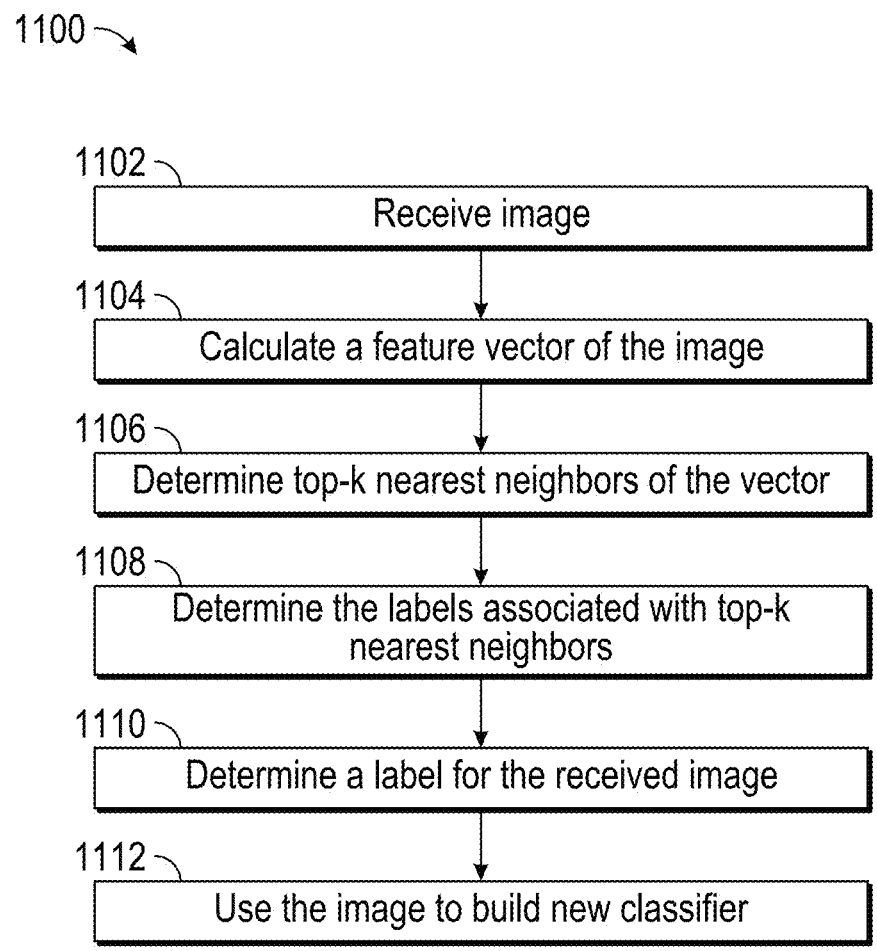
FIG. 11 depicts a flow diagram illustrating an exemplary process for analyzing images associated with social media posts in accordance with some embodiments.

FIG. 11 depicts an exemplary process 1100 for classifying a target image using a classifier that utilizes a k-NN classification scheme. In some examples, this process includes using a classifier object (e.g., an SMR object) to classify an inputted image, wherein the output is a list of pairs, each pair being a label and an associated confidence level.

At box 1102, a system receives an image. For example, the system receives the target image, identified as "image201.jpeg" of dataset 600 (e.g., image 802 of FIG. 8). In some embodiments, the image (or an address or other identifier of the image) is retrieved via an API of a social media network as described above. The received image may be pre-processed as described above.

At box 1104, the system calculates a feature vector of the image. For example, the image is transformed into a vector $v_i$ as described above with regard to blocks 904 and 906 of process 900 (FIG. 9.) For instance, the image can be pre-processed and converted into a predefined shape (e.g., 100×100 pixels), flattened into three vectors representing RGB color channels (three vectors of 10,000 elements in length), and concatenated (into a single 30,000 element vector). In some examples, calculating the feature vector includes one or more of the following processes described above with respect to process 1000 (FIG. 10): creating SMR sub-matrices from a vector representation of the image, creating quantized value matrices from the sub-matrices, and creating incidence matrices for each pixel position and quantized value. In some examples, one or more other appropriate pre-processing techniques can be used, such as image key points, image patch color histograms, or the like.

At box 1106, the system determines the top-k number of nearest neighbors of the received image's feature vector. In some embodiments, matrix-vector multiplication is performed in order to determine the top-k nearest neighbors (e.g., feature vectors). For example, the following equation can be used: $s=(M)\cdot(v_i)^T$, where s is a vector composed of the dot product of the transposed feature vector $v_i$ with each vector of the initial dataset (e.g., that make up matrix M). In this example, if M is 100×300,003 and $v_i$ is 1×300,003, then s is 100×1. The entries of the resulting vector s correspond to similarity scores computed with the sparse matrix recommender. A vector $s_k$ can then be created which includes non-zero entries only for the top-k entries (e.g., rows of s).

At box 1108, the system determines the labels associated with the top-k nearest neighbors. This can also be referred to as determining the label-confidence pairs. In some embodiments, the label-confidence pairs are determined by multiplying the vector $s_k$ by the sub-matrix of labels $M_{lbl}$. For example, the pairs are given by the vector result, $v_{result}$, of the following expression: $v_{result}=v/\text{sum}(v)$, wherein $v=(s_k)\cdot(M_{lbl})$.

At box 1110, the system determines a label for the received image. In some embodiments, the system determines a plurality of labels for the received image. For example, an image may have more than one label associated with it. For instance, if an image depicts both a person and a playing field, it can be labeled both "playfield" and "selfie".

There are multiple techniques for determining the label of an image, for example, where the top k nearest neighbors correspond to multiple labels.

In some embodiments, the number of occurrences of each label of the top-k nearest neighbors are added up. This is referred to as a simple voting scheme. For instance, if k=3 and two of the nearest neighbors are each only associated with the label "playfield" and one of the nearest neighbors is only associated with the label "selfie", then the received image is labeled as "playfield" (e.g., by 2 votes to 1). In other words, the received image is classified with the label whose feature vectors are most frequent among the top-k most similar feature vectors to the feature vector $v_i$ of the received image.

In some embodiments, a weighted sum of the top-k vectors is used. For example, the weights are given by the similarity (e.g., the similarity score) of the feature vectors for the images in the database with the feature vector $v_i$ of the received image. For example, if the feature vector of a target image is significantly similar to a feature vector of an image labeled "selfie" and is not very similar to feature vectors of two images labeled "playfield", then the label "selfie" will be weighted higher—as a result, the target image can be labeled "selfie" even though that label would be outnumbered using a simple voting scheme of the top k (e.g., 3) results. In some examples, the weighted sum is used in addition to the simple voting scheme.

In some embodiments, the system stores the determined label. For example, the system can store the determined label in a dataset. In some examples, the label can be associated with the social media post that includes the image represented in a dataset.

At box 1112, the system uses the image to build a new classifier. In some embodiments, building a new classifier with the data from the received (and classified) image is optional. For example, if a received image is successfully classified, the data of the image can be added to the initial dataset (e.g., which would then be composed of 100+1=101 images), from which a new classifier can be built (e.g., in accordance with the process 1000 of FIG. 10.)

The use of images, which have been classified, in order to create a new classifier (e.g., creating a larger set of data) can provide valuable feedback to the system. By enhancing the classifier through the introduction of new data, the accuracy or precision of the classifier can be increased.

The use of k-Nearest Neighbors classification schemes in order to classify images according to labels has the advantage that it can be performed quickly in real time. Another advantage of k-Nearest Neighbors classification schemes is that they require little training, unlike some other classification schemes. While more complicated classification schemes may be capable of more accurate or precise results, they do so at the cost of decreased speed and simplicity. Applicants have achieved excellent results using image classifiers based on k-Nearest Neighbors classification schemes. The combination of speed, ease of creating and building classifiers, and high quality results makes the use of k-Nearest Neighbors image classification schemes, according to the techniques described herein, well-suited for real time handling of large amounts of social media post data being generated during events.

ii. Deep Learning Image Classifiers

In some embodiments, an image classifier utilizes a deep learning classification scheme (e.g., an artificial neural network, a deep neural network, a convolutional neural network). A deep learning classification scheme can be used to classify an object (e.g., determine a class membership of an image) using a classification scheme that has been trained based on an initial set of training samples for which classes (labels) are known.

Application of a classifier that utilizes a deep learning classification scheme generally involves two processes: "building" the classifier (which can also be referred to as "training" the classifier), and performing classification using the classifier.

Figure 12:
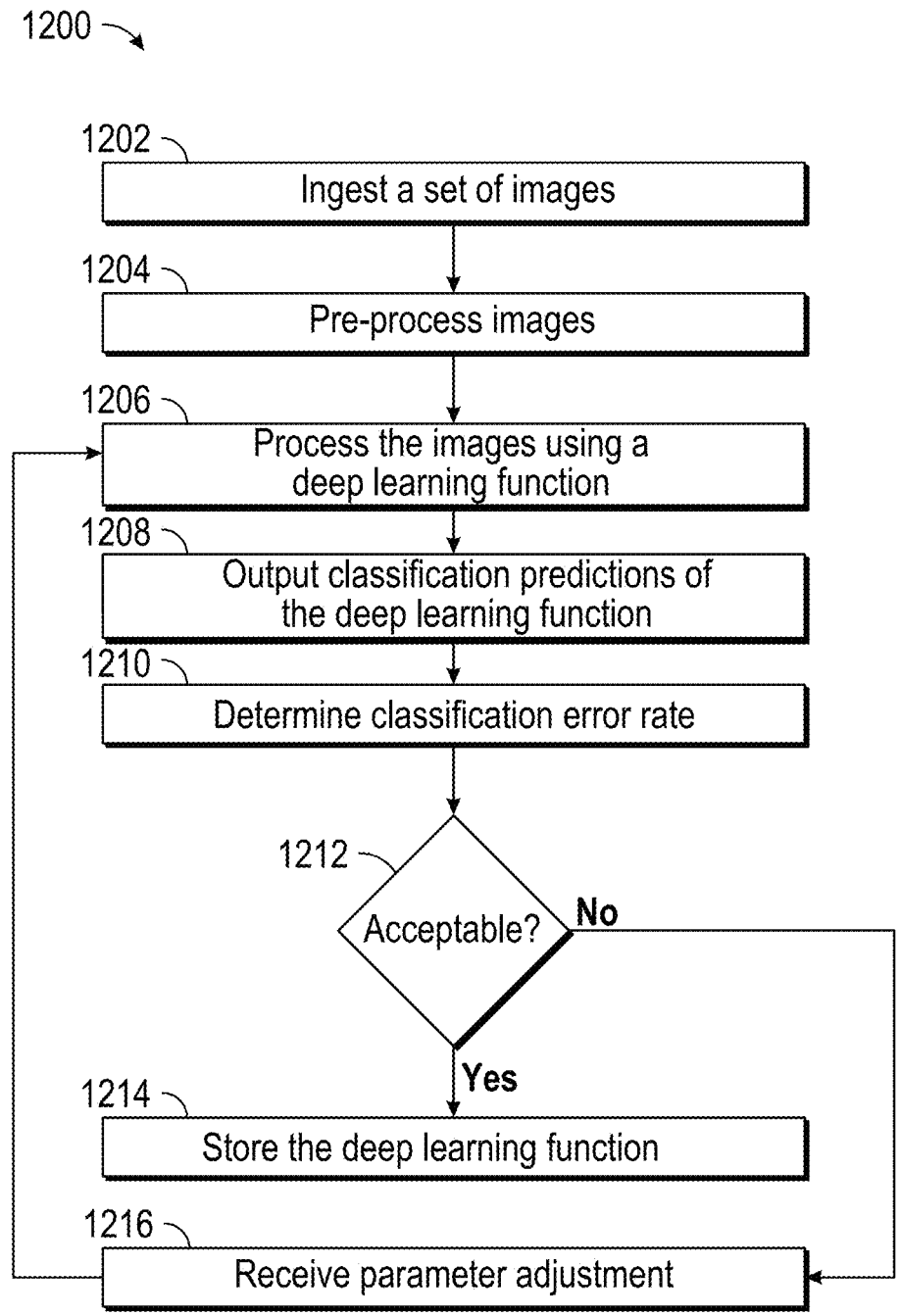
FIG. 12 depicts a flow diagram illustrating an exemplary process for analyzing images associated with social media posts in accordance with some embodiments.

FIG. 12 depicts an exemplary flow diagram of a process 1200 for training a classifier that utilizes a deep learning classification scheme. The training phase typically involves iteratively applying the deep learning classification scheme's fundamental computation steps (e.g., backpropagation) to one or more images in the initial training sample dataset, and adjusting the parameters of the classification scheme (e.g., neural network) until an acceptable error rate is achieved.

At block 1202, a system ingests a set of images. For example, the system can ingest the set of images as described above with respect to block 902 of FIG. 9. At block 1204, the system pre-processes the set of images. For example, the system can pre-process the set of images as described above with respect to block 904 of FIG. 9.

At block 1206, the system processes the set of images using a deep learning function. For example, if a dataset (e.g., dataset 300 of FIG. 3) includes 100 images, these images are processed during an initial iteration of a deep learning function.

At block 1208, the system outputs classification predictions of the deep learning function. For example, after the initial processing using the deep learning function, the system outputs a set of class predictions for each image in the set of images.

At block 1210, the system determines a classification error rate. For example, using data included with the ingested images that indicates the correct class labels associated with the images ingested, the system determines the error rate of the deep learning function's output. Any appropriate technique for determining error can be used. For example, one measure of error is the precision of the classification scheme, which can be defined as:

$$E_{precision} = \frac{\text{(Total \# of images classified correctly)}}{\text{(Total \# of images classified)}}$$

An alternative measure of error is the recall of the classification scheme, which can be defined as:

$$E_{recall} = \frac{\text{(Total \# of images correctly assigned to a class)}}{\text{(Total \# of images that should be assigned to a class)}}$$

At block 1212, the system determines whether the error rate is acceptable. If yes, then the system proceeds to box 1214, and stores the deep learning function. If not, the system proceeds to box 1216, and receives a parameter adjustment. The acceptable error rate can depend on the particular situation and application, as well as on user preferences. For example, the system may have a predefined threshold representing an acceptable error rate.

In some embodiments, the system performs automatic threshold selection. In this example, the classifier would train itself through threshold selection.

In some embodiments, the system receives a parameter adjustment via user input. For example, a user can adjust one or more parameters of the deep learning function (e.g., an artificial neural network).

After block 1216, the system returns to block 1206 and processes the set of images using the deep learning function again. In this example, the system received a parameter adjustment to the deep learning function, so the classification results may be different. As shown in FIG. 12, the process 1200 iterates in this manner until an acceptable error rate is achieved.

Figure 13:
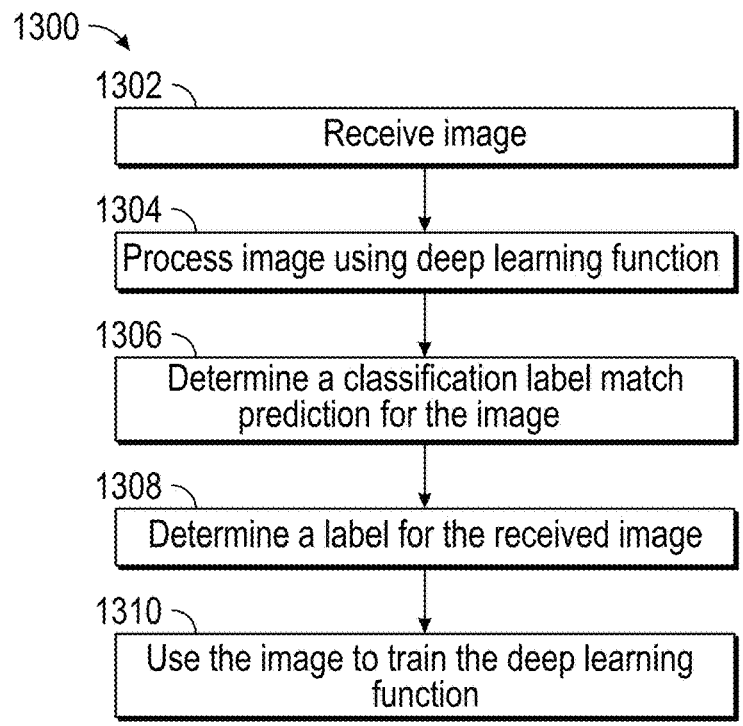
FIG. 13 depicts a flow diagram illustrating an exemplary process for analyzing images associated with social media posts in accordance with some embodiments.

FIG. 13 depicts an exemplary process 1300 for classifying a target image using a classifier that utilizes a deep learning function. At box 1302, a system receives an image. For example, the system receives the target image image201.jpeg of dataset 600 (e.g., image 802 of FIG. 8A). In some embodiments, the image (or an address or other identifier of the image) is retrieved via an API of a social media network as described above. The received image may be pre-processed as described above.

At block 1304, the system processes the image using a deep learning function. For example, the deep learning function used at block 1304 can be the deep learning function (having an acceptable error rate) stored at box 1214 of process 1200. In this example, the trained deep learning function (e.g., an artificial neural network) is now used to classify an image that is not part of the set of training images (e.g., an image that has been pulled from social media post in real time).

At block 1306, the system determines a classification label match prediction for the image. For example, the result of processing the image with the deep learning function is used to determine the prediction. In this example, the image201.jpeg of dataset 600 (depicted in image 802 of FIG. 8A) has a class prediction of "selfie" where the set of labels are {"playfield", "selfie", "other"}. The prediction can be a numerical probability that the image matches a given label, or can be a similarity score between the image and the representative set of images of the given label. In some examples, then, each label can have a prediction (e.g., probability and/or similarity score) indicating the likelihood that the image matches other images from the given class.

At block 1308, the system determines a label for the received image. In some embodiments, the deep learning function (e.g., artificial neural network) outputs probabilities for each classification label in the set of labels. In some examples, the highest probability label can be assigned to the image. In some examples, the label with the highest probability can be assigned to the target image only if the probability exceeds a threshold. In some examples, any label can be assigned to an image if its respective probability exceeds a threshold (e.g., the image can be classified with two labels). For example, the image 802 of FIG. 8A might also have a relatively high probability of matching the "playfield" label, in addition to "selfie", given that the image depicts two persons as well as a large amount of the interior of the basketball arena venue ("City Arena").

In some embodiments, the deep learning function generates a plurality of output results. In some embodiments, a plurality of deep learning functions are used to process the received image. In some examples, a class label is assigned to the received image based on simple voting of the plurality of outputs from the one or more deep learning classification schemes.

At block 1310, the system uses the received image to train the deep learning function. Using the received image to train the deep learning function (e.g., using process 1200) is optional. An increase in the number of representative images used to train the classifier, however, can be potentially beneficial for the classification of future images.

iii. "Cold Start" Phase Using Image Classifiers

While k-Nearest Neighbors and deep learning functions are discussed above, other image classification schemes can be used to create a classifier for use in accordance with the techniques described herein. In some embodiments, regardless of the underlying technique for image classification, a system will perform a "cold start" process. For example, if a classifier does not exist, one can be created and tuned in order to be effective at image classification. Though the cold start phase is broadly applicable to any classifier, it is similar to the processes of building the k-Nearest Neighbors classifier or training the deep learning classifier as described above.

Figure 14:
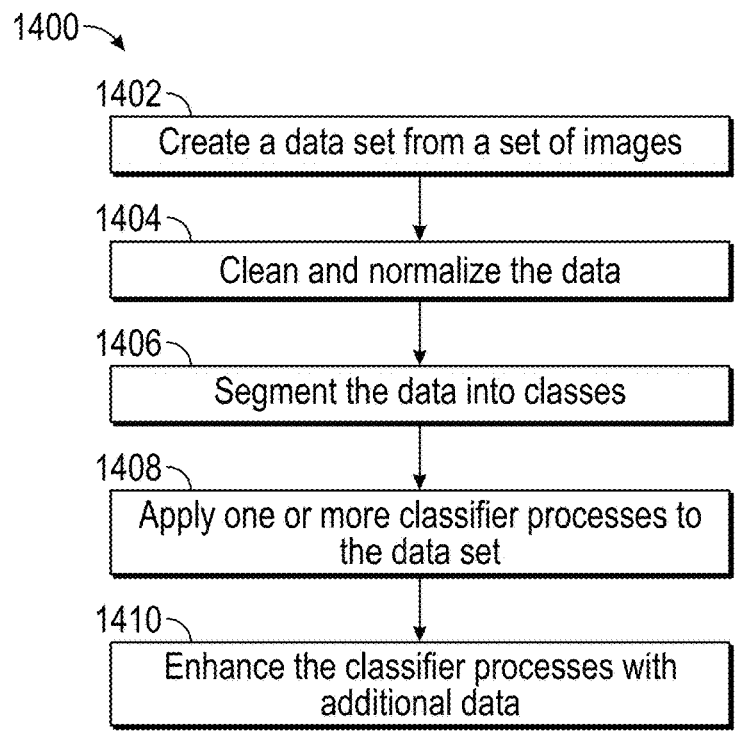
FIG. 14 depicts a flow diagram illustrating an exemplary process for analyzing images associated with social media posts in accordance with some embodiments.

FIG. 14 depicts an exemplary process 1400 for creating a classifier from a set of images using any classification scheme. At block 1402, a system creates a dataset from a set of images. For example, the set of images can be accessed or retrieved as described above (e.g., via an API, from memory storage, etc.). Creating the dataset can include the process of ingesting image data, as described above. In some embodiments, creating the dataset includes creating a dataset from social media post data. In some examples, the social media post data includes more than image data (e.g., text, hashtags, geotags, image labels, etc.) The dataset created (e.g., dataset 300, dataset 600) from the set of images is formatted and organized in any manner that is computer-readable. In some embodiments, the system pre-clusters the images into defined classes.

In some examples, the data ingested to create the dataset is from social media posts associated with images known to have been posted at and/or that depict a geographic location (e.g., a sporting venue). In some embodiments, the system retrieves posts from one or more social media networks, wherein the posts have a geotag (or other location information) identifying a geographic location of interest. For example, the system downloads the images associated with these posts. In some embodiments, the system retrieves the post data from a database of posts previously retrieved (from social media networks) that are confirmed (e.g., by geotag, or by user confirmation) to have been posted at and/or depict the geographic location of interest.

At block 1404, the system cleans and normalizes the data. Cleaning and normalizing the data is meant to ensure that all images of the dataset are represented within common scales of values (e.g., one or more of sizes, pixel colors, brightness, etc.) and that outliers are explained and/or removed.

In some embodiments, one or more of the following normalization techniques are applied over the image dataset: imposing a common shape for all images (e.g., 100×100, 320×320), quantizing color data, and imposing a common color space.

In some embodiments, outliers in the dataset are removed or explained. For example, outliers can include: images that are almost entirely black or entirely white, meaningless images (e.g., blurry, smeared, unclear, thumb on lens, etc.), an image that is repeated multiple times, and images having nothing to do with the context (this can be subjective and interpreted differently for different datasets).

In some embodiments, cleaning and normalizing the data is an automated process. In some embodiments, cleaning and normalizing the data relies on user input (e.g., to select irrelevant images as outliers). In some embodiments, some combination of both automation and user input are used.

At block 1406, the system segments the data into classes. In some embodiments, the accessed data (e.g., set of images, social media posts) will already be associated with one or more labels of a set of labels (classes). In some examples, the images associated with known locations will need to be segmented into classes (also referred to as assigning labels to the images). Examples of classes include the set of classes {"playfield", "selfie", "other"} discussed above. In some embodiments, segmenting the data into classes includes creating a dataset for each image class. In some embodiments, segmenting the data into classes includes creating a dataset that includes segments organized by class. For example, a single dataset can have images of the same class grouped adjacently within the same data structure. In some embodiments, the system segments the image data into classes based on user input. For example, user input is received that specifies or confirms a class assignment.

Classes can be derived manually (e.g., by iteratively applying data analysis and trials), automatically (derived from available data), or both. Manually deriving a class can include receiving user input representing a plurality of images for each class label that a user observes after browsing the training dataset. For example, user input can specify 12 images that should be labeled "playfield". The system then creates a classifier (e.g., as described above) based on these specified (thus, labeled) images. Automatically creating classes can include processing the images to determine groups of related (e.g., visually similar) images. In some embodiments, deriving classes is a combination between automatic and manual processes. For example, segmenting can be based on some combination of user input (e.g., verification) and system suggested classes. Segmenting the images into classes can be an iterative process—for example, they system can receive user input that identifies 5 images that form a class; then a system suggests 5 more images, for which user input verification is received for 3 of the images; then the system suggests another 5 images, based on the 8 verified images; and so on. This process can be repeated until satisfactory classes are created and populated.

As described above, for example, the system can use the classifier to identify additional images in the dataset (or other datasets) to be associated with each of the classes. The system stops identifying images when a sufficient number of images are found for each class, or when the dataset is exhausted. As can be seen, the process of assigning images to classes in order to create an initial dataset (used to build a classifier) is semi-automatic, and is done at initial stages of classifier creation, when there is little or no prior knowledge of image-label associations. As the knowledge of the system increases, (e.g., through robust classifiers) the process can become more automated.

At block 1408, the system applies one or more image classifiers to the dataset until acceptable image classification results are obtained. For example, the image classifiers are applied and tuned until an acceptable error rate is achieved. For instance, the system can modify parameters of the classification scheme(s) until an acceptable level of precision and/or recall is achieved for a given class. The balance of precision versus recall can be adjusted to suit different scenarios or preferences. In some embodiments, the classifier is applied to a different dataset (e.g., different than the initial dataset) to test the classifier's error rate.

In some embodiments, if a k-Nearest-Neighbors classification scheme is used as a classifier, the value of k can be adjusted in order to tune the classifier parameters. Other exemplary tuning parameters are the selection and application of Latent Semantic Indexing (LSI) functions to be applied over the contingency values, selection and addition of variables based image transformations (e.g., pixel clusters, Red-Green-Blue to Hue-Saturation-Value, etc.), tweaking the significance of different pixel patches (e.g., the image corners are less important that the image center), using matrix factorization techniques for extracting pixel patches topics, using some or all of data obtained from a Scale Invariant Feature Transform (SIFT), or similar functions.

In some embodiments, different classification schemes are used for identifying each class. For example, one type of classification scheme (e.g., k-Nearest Neighbors) may provide superior results identifying images of a first class, whereas another type of classification scheme (e.g., deep learning) may provide superior results identifying images of a different second class. In some embodiments, multiple classifiers are used together to identify images of the same class. For example, two different classifiers may complement each other to produce superior results for a single class, rather than one classifier alone. In this example, the results of each classifier can be further processed to determine the classification decision. For example, a simple voting scheme using the results of each classifier can be used to determine the classification label.

In some embodiments, the system uses an approximation residual of dimension reduction singular value decomposition ("SVD"). In some embodiments, the system creates a composite classifier that takes into account weights of its component classifiers.

At block 1410, the system enhances the classifier processes with additional data. For example, as touched on above, if the classifier classifies new images from additional data or datasets, those images can be used to create new, or enhance previously-created, classifiers. In some embodiments, enhancing the classifier with additional data is optional.

In some examples, additional data, such as hashtag retrieved messages that include images, can be used to further build/train the classifiers. In some embodiments, additional data is evaluated based on whether it would contribute to enhancing the knowledge of the classifier and avoid the "saturation point" where: (i) adding new data makes the classifier slower without improving the accuracy (e.g., increases the processing time required to output a result); or (ii) adding new data over-trains the classifier (e.g., produces worse results, such as less accurate).

b. Semantic Analysis

In addition to performing image classification, a system performing location resolution in accordance with the techniques described herein can also apply semantic analysis to the content of a social media post. Semantic analysis (otherwise referred to as "language analysis") can be used to identify and quantify patterns and similarities in the textual content (e.g., text, hashtags) in social media posts. This is particularly useful, for example, where a social media post does not include an image but still contains valuable insight into a customer's user experience at a geographic location. Relying solely on image analysis could result in this content being overlooked, and valuable data lost. Further, using semantic analysis complements image analysis, such that the results of a geographic location resolution process can be improved.

Any appropriate semantic analysis technique can be used to analyze the content of social media posts. In some embodiments, the system uses a combination of two or more semantic analysis techniques. Two particular techniques are discussed below, though one skilled in the art would recognize the applicability of other known or future semantic analysis techniques for determining textual similarity between data.

i. Named-Entity Recognition

In some embodiments, semantic analysis includes performing a named-entity recognition process. Named-entity recognition involves the identification and classification of named entities in a block of text into categories such as persons, organizations, locations, expressions of time, quantities, monetary values, and the like.

Figure 15:
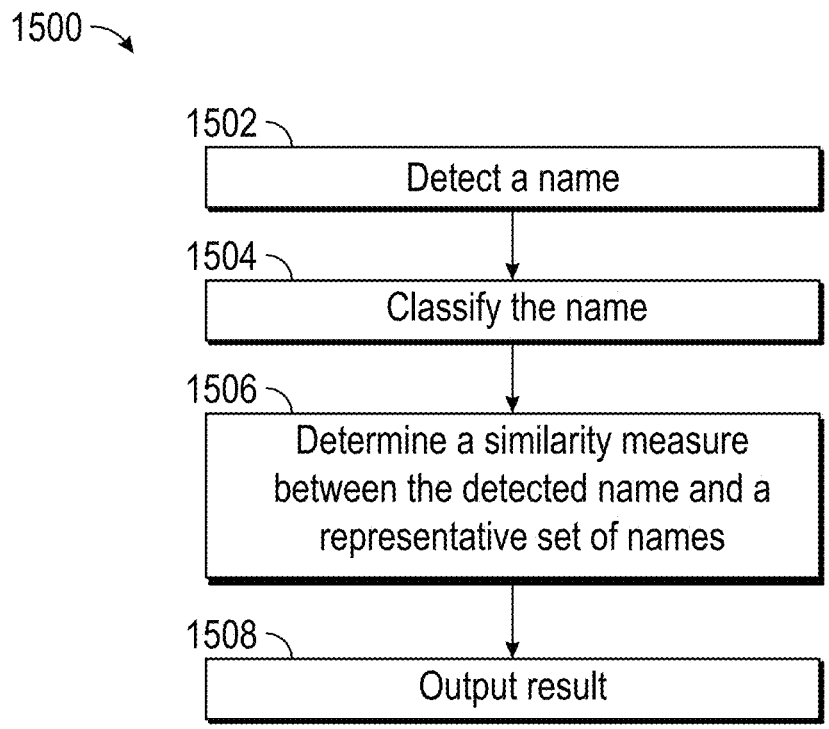
FIG. 15 depicts a flow diagram illustrating an exemplary process for analyzing text associated with social media posts in accordance with some embodiments.

FIG. 15 depicts an exemplary process 1500 for performing a named-entity recognition process on a block of received text. Named-entity recognition is also referred to as "entity name recognition". At block 1502, the system detects a name. For example, the system detects an entity name in target text. For example, in the social media post number 3 of dataset 600 (FIG. 6), the system detects the name "Alex", which corresponds to a person. In another example, the system detects the name "Team" in social media post number 8 of dataset 600, which corresponds to an organization.

At block 1504, the system classifies the name. For example, the system classifies the name "Alex" as a person. In another example, the system classifies the name "Team" as an organization. In some embodiments, detection (e.g., block 1502) and classification (e.g., block 1504) of a name are performed together and/or are part of the same process. For example, the name Alex can be predefined as being in the class "persons". In other words, the detection of the Alex as a name can inherently entail the identification that the name is a person.

In some embodiments, the system performs the techniques described above with reference to blocks 1502 to 1504 for a plurality of named entities in the block of received text. In some embodiments, the block of received text includes data from one or more social media posts.

At block 1506, the system determines a similarity measure between the detected name and a representative set of names. In some embodiments, the system determines a similarity measure between a plurality of detected names and the representative set of names. For example, the system can compare the name "Alex" or "Team" to a representative set of names. The representative set of names is, for example, data representing one or more social media posts of a known location. The one or more social media posts should be posts of a known location, such that the system compares a post of an unknown location to those of known location. For instance, by analyzing the post text "Team wins!!", the system determines the similarity between the name "Team" and a set of posts of known location, such as the posts of dataset 300. In this example, post 1 in dataset 300 includes the text, "What a beautiful new arena! Can't wait to watch Team play tonight!". Thus, because the phrase "Team" appears in both texts, the system determines a similarity measure reflecting that these posts are similar.

The measure of similarity between the detected name and a representative set of names can be expressed in one or more appropriate ways. In some embodiments, the similarity is expressed as a single value. For example, the value can be the total number of occurrences of the name in the set of names (e.g., names within posts of known location). In other examples, the value is a score based on the occurrence of the name in the set of names. For example, the score can be based on the proportion of social media posts of a known location that include the name. In other examples, the score is based on the occurrence of the name within the representative set of names, relative to a second set of representative names (e.g., social media posts of a different known location). One of skill in the art would readily appreciate that there are many other ways to express a similarity measure, any of which are intended to be within the score of this disclosure.

In some embodiments, the similarity measure value can be a plurality of values. For example, the values can each correspond to the total number of occurrences of each of a plurality of detected names in the set of names.

In some embodiments, the similarity measure is a combined metric based on the occurrence of the one or more detected names in the set of representative names. For example, if multiple detected names from a post being analyzed match the set of names, a combined metric could be higher than if only one detected name matches a name in the set of representative names.

At block 1508, the system outputs a result. In some embodiments, the system outputs the similarity measure. The output (e.g., similarity measure) can be used, in accordance with other data, in the determination of a location for the social media post being analyzed.

ii. Topic Model/Topic Extraction

In some embodiments, semantic analysis includes performing a topic model extraction process. A topic model is a statistical model that can be used to determine abstract "topics" that occur in blocks of text. For example, in blocks of text about the topic of a basketball game, the following words would be expected to occur together: "basketball", "court", "tip off", "bucket", "dunk", "shot", and other words associated with the game of basketball. By identifying these word clusters in a given block of text, a determination can be made of the likelihood that a given social media post (containing those words) relates to a particular topic (e.g., basketball). In addition to the presence of topic-related words, the semantic structure of the words can also be used as part of the topic model analysis. If the topic is indicative of an event or a particular location, then this determination can aid in the location resolution process.

Figure 16:
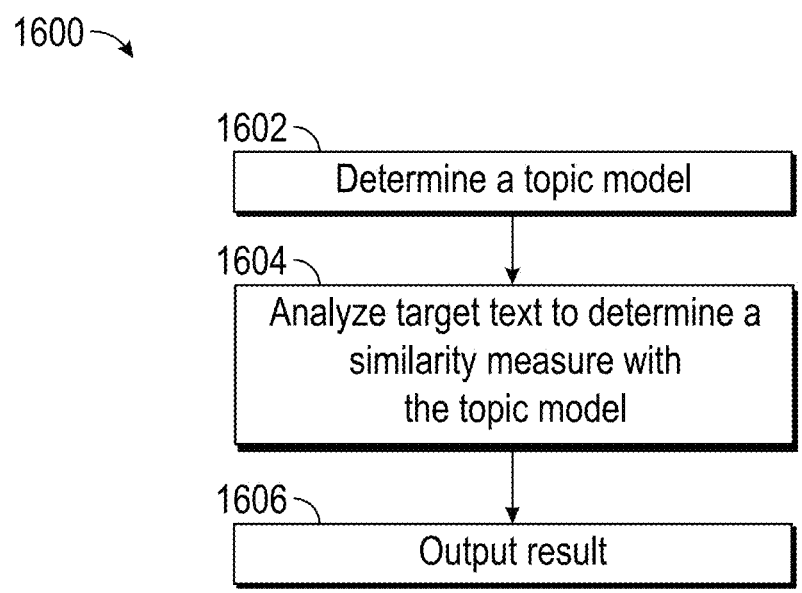
FIG. 16 depicts a flow diagram illustrating an exemplary process for analyzing text associated with social media posts in accordance with some embodiments.

FIG. 16 depicts an exemplary process 1600 for a topic extraction process on a block of received text in accordance with some embodiments. At block 1602, the system determines a topic model. For example, to analyze whether a given social media post relates to a basketball game, the system determines the topic model "basketball". Determining the topic model can include, for example, accessing data representing that topic model. In some embodiments, the topic model data is stored as a data structure and retrieved from memory. The topic model data can be stored remotely or locally. In some embodiments, determining the topic model includes building the topic model from a dataset of text. For example, the text of dataset 300 can be analyzed in order to extract a topic model for the topic "basketball". In some embodiments, a plurality of topic models is determined.

At block 1604, the system analyzes target text to determine a similarity measure with the topic model. For example, the system analyzes the social media post text and hashtags from post 2 of dataset 600 (FIG. 6) to determine their similarity to the topic "basketball". In some embodiments, the system extracts words from the target text of the post. For example, the system can extract the words "game", "Team", and "basketball" from the text and hashtags of the post. Using this group of words, or some subset or superset thereof, the system determines a similarity measure with the topic model (e.g., derived from an initial dataset of the social media posts from the known location). In some embodiments, the system analyzes the target text to determine a plurality of similarity measures with a plurality of topic models, respectively.

The measure of similarity between the target text and the topic model can be expressed in one or more appropriate ways. In some embodiments, the similarity is expressed as a single value. For example, the value can be the total number of occurrences of words in the target text that occur in the topic model. In other examples, the value is a score based on the occurrence of words shared with the topic model. For example, the score can be based on the proportion of words in the target text that match the topic model relative to the number of words that do not match the topic model. In some examples, the similarity score is non-linear with respect to the topic overlap between the topic model and the text—that is, the similarity can rise multiplicatively as the proportion of target text that matches the topic model increases. One of skill in the art would readily appreciate that there are many other ways to express a similarity measure, any of which are intended to be within the scope of this disclosure.

At block 1606, the system outputs a result. In some embodiments, the system outputs the similarity measure. The output (e.g., similarity measure) can be used, in accordance with other data, in the determination of a location for the social media post being analyzed.

3. Location Resolution

Up to this point, various specific concepts related to the retrieval, storage, and analysis of social media post content have been described. These concepts, used alone, might reveal limited insights into relationships between social media post data. However, determining the geographic location associated with social media posts that lack an associated geographical reference in a reliable and useful way (e.g., in real time) presents a particularly difficult challenge. An exemplary location resolution technique is described below.

Figure 17:
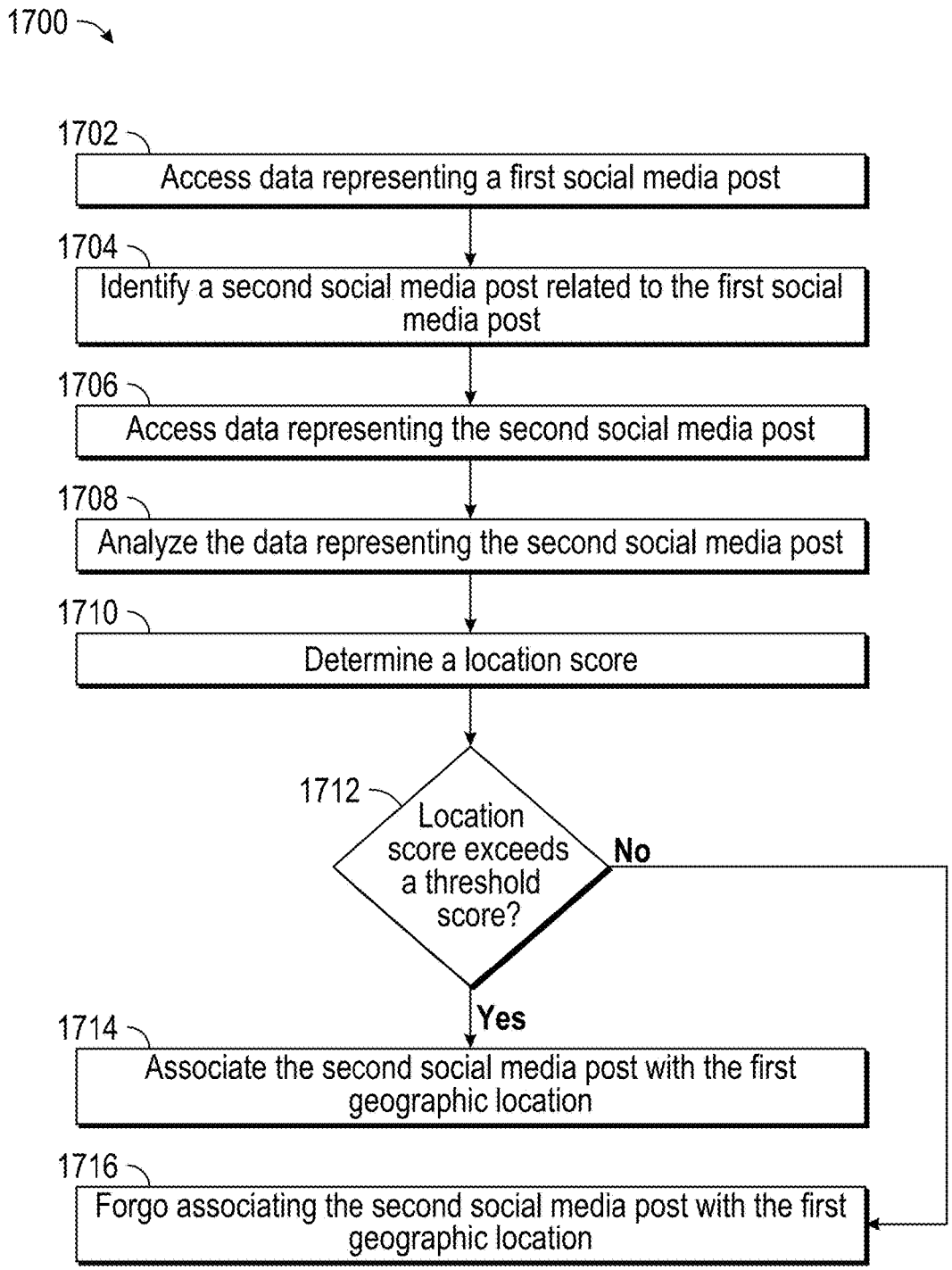
FIG. 17 depicts a flow diagram illustrating an exemplary process for determining a geographic location of a social media post in accordance with some embodiments.

FIG. 17 depicts an exemplary process 1700 for location resolution of a social media post, in accordance with some embodiments. At block 1702, the system accesses data representing a first social media post. In some embodiments, the system accesses data representing a first social media post that is associated with a geotag, or which has otherwise been verified to have been posted at and/or depict a geographic location. For example, the system accesses social media post number 2 of dataset 300 (FIG. 3), which is also post number 4 of dataset 600 (FIG. 6). As described above, accessing the post can include retrieving data representing the post from storage (e.g., stored as a dataset), from a social media network (e.g., via an API), or the like. In some embodiments, the data representing the first post includes an image and/or a reference to an image. In some embodiments, the data representing the first post includes a video and/or a reference to a video.

At block 1704, the system identifies a second social media post related to the first social media post. For example, the second social media post can be related the first social media post by virtue of having been posted by the same user account, and near in time to the first post. Further, in this example, the second social media post does not include an associated geographic location in its representative data (e.g., the post does not include a geotag). For instance, the system identifies any of posts 1-3 and/or 5-8 of dataset 600 as a related post (e.g., posted by the same user). For the sake of this example, the system identifies post 3 of dataset 600, which includes the text, "At the game with Alex B." Specific exemplary techniques for identifying related social media posts are discussed below, with reference to FIG. 18.

At block 1706, the system access data representing the second social media post. As described above, accessing post data can include retrieving data representing the post from storage (e.g., stored as a dataset), from a social media network (e.g., via an API), or the like. For example, accessing the data can include retrieving an image associated with the data, where the data contains a reference or link to the image.

At block 1708, the system analyzes the data representing the second social media post. In some embodiments, analyzing the data representing the second social media post includes performing an image classification process to an image associated with the post (e.g., included in the data representing the second post). For example, the system can perform one or more of exemplary processes 1100 (FIG. 11) and 1300 (FIG. 13). In this example, the image associated with the identified second post that is analyzed is image 802 of FIG. 8A, which depicts two people posing while at a basketball game at City Arena.

In some embodiments, analyzing the data representing the second social media post includes performing a semantic analysis process to text associated with the post (e.g., included in the data representing the second post). For example, the system can perform one or more of exemplary processes 1500 (FIG. 15) and 1600 (FIG. 16). In this example, the text associated with the identified second post that is analyzed is "At the game with Alex B." In some examples, the system also performs semantic analysis on hashtags associated with a post.

At block 1710, the system determines a location score. In some embodiments, the location score is determined based on analysis of the data representing the second social media post. For example, the location score can be based on the output of one or more of the image classification and the semantic analysis processes. In some embodiments, other values are taken into account to determine the location score. Exemplary other values include a measure representing the separation in time between when the second social media post was posted and when the (related) first social media post of known location was posted. Put another way, if the posts are 5 hours apart and an event of interest at the geographic location is only 1 hour in length, there is a smaller likelihood that the non-geotagged post was posted from the geographic location, which can be reflected in the location score. Thus, in some examples, the location score can be thought of as a confidence score that the second social media post was also posted at and/or depicts the geographic location with which the related first post is associated.

At block 1712, the system determines whether the location score exceeds a threshold score. For example, the threshold score can be a predefined value.

At block 1714, if the location score exceeds the threshold score, the system associates the second social media post with the first geographic location. For example, if the combination of the image classification, semantic analysis, and other relevant factors combine for a location score that exceeds the threshold, the second social media post is assigned the same geographic location as the first social media post. Thus, if (1) the image analysis of image 802 of FIG. 8A (e.g., from the second post) is determined to likely depict the interior of City Arena, and (2) the words and hashtags used in the second post match other posts known to have been posted at the basketball arena, then (3) the location score will likely exceed the threshold and the second post will be associated with the geographic location "City Arena".

At block 1716, if the location score does not exceed the threshold score, the system forgoes associating the second social media post with the first geographic location.

In some embodiments, a first user account posted the first social media post, and identifying the second social media post related to the first social media post comprises: determining a window of time based on a time associated with the first social media post; and identifying one or more social media posts posted by the first user account during the window of time, wherein the one or more social media posts includes the second social media post. For example, if post 4 of dataset 600 is the first post, the system determines a window of two hours in length (one hour before and one hour after the time of post 4, Aug. 13, 2018 at 7:30 PM). Post 3 of dataset 600 would be identified as the second post because it falls within the two hour window (it was posted only fifteen minutes before the first post, at 7:15 PM on the same day).

In some embodiments, a first user account posted the first social media post, and identifying the second social media post related to the first social media post comprises: determining that a second user account is mentioned and/or tagged in the first social media post; and identifying one or more social media posts posted by the second user account, wherein the second social media post was posted by the second user account, and wherein the first and second user accounts are different. For example, if post 3 of dataset 600 were taken to be the first social media post (assuming it had an associated geographic location), then the system would identify the second social media post from posts by Alex B., who is mentioned in the text of the first post, post 3.

In some embodiments, identifying the second social media post related to the first social media post comprises: determining that the first social media post includes a first tag; and identifying the second social media post based on the first tag, wherein the second social media post includes the first tag. For example, post 2 of dataset 600 can be identified as a related social media post to post 4 of dataset 600 because it includes the shared hashtag "#GoTeam".

In some embodiments, a first user account posted the first social media post, and identifying the second social media post related to the first social media post comprises: determining that a third user account interacted with the first social media post; and identifying one or more social media posts posted by the third user account, wherein the second social media post was posted by the third user account, and wherein the first and third user accounts are different. For example, the system identifies the second social media post from the posts of a user account who liked, shared, commented on, or otherwise interacted with the first social media post (e.g., posted by a different user account).

In some embodiments, identifying the second social media post related to the first social media post comprises: accessing a database of identifiers associated with users previously identified as likely to be located at the first geographic location; matching a fourth user account to an identifier in the database; and identifying one or more social media posts posted by the fourth user account, wherein the second social media post was posted by the fourth user account. For example, the system determines that the email address associated with the user account matches a database of identifiers (e.g., email addresses) of persons who purchased tickets to an event (e.g., that will be held at the geographic location).

In some embodiments, analyzing the data representing the second social media post comprises: performing, by one or more processors, semantic analysis to determine a semantic similarity score between the second social media post and a collection of data representing social media posts identified as being associated with the first geographic location; wherein the location score is determined based at least in part on the semantic similarity score.

In some embodiments, if the location score for the data representing the second social media post exceeds the threshold location score, the system adds the data representing the second social media post to the collection of data representing social media posts identified as being associated with the first geographic location. For example, the system adds data representing the second social media post to a dataset of posts of known location.

In some embodiments, the data representing the second social media post includes an image, and analyzing the data representing the second social media post comprises: applying, by one or more processors, a computer vision classification algorithm to the image of the data representing the second social media post to determine a first class confidence score; if the first class confidence score for the image of the data representing the second social media post exceeds a threshold first class confidence score, classifying the image of the second social media post as matching the first class, wherein the location score is determined based at least in part on the classification of the image of the second social media post as matching the first class; if the first class confidence score for the image of the data representing the second social media post does not exceed the threshold first class confidence score, forgoing classifying the image of the second social media post as matching the first class. For example, the system applies one or more image classifiers (e.g., such as those discussed above) to an image of the second social media post.

In some embodiments, the computer vision classification algorithm includes one or more of: a nearest-neighbor classification algorithm and an artificial neural network classification algorithm. For example, the system applies one or more of a k-Nearest Neighbor or deep learning based classifier, as discussed above.

In some embodiments, if the location score for the data representing the second social media post exceeds the threshold location score, the system uses the data representing the second social media post to update the computer vision classification algorithm. For example, the system enhances one or more classifiers using the data of the second social media post.

In some embodiments, the system accesses, by one or more processors, data representing a third social media post, wherein the data representing the third social media post does not include geographic location data identifying the first geographic location, and wherein the data representing the third social media post includes an image; and applies, by one or more processors, the updated computer vision classification algorithm to the image of the data representing the third social media post. For example, the system performs location resolution on an additional, third social media post using the classifier enhanced with the data from the second social media post.

In some embodiments, the computer vision classification algorithm relies on at least one image that matches the first class and that is not associated with the first geographic location. For example, the image classifier is built from (or trained using) an image from (or depicting) a geographic location other than the geographic location associated with the related post, but that matches a common class label. That is, an image from a different venue, "National Arena", is used to classify the image of the second social media post, which depicts "City Arena". The images, however, both belong to the class "playfield".

In some embodiments, if the location score for the data representing the second social media post does not exceed the threshold location score, the system forgoes associating the second social media post with the first geographic location. For example, if the results of the analysis do not tend to show that the social media post was posted from the geographic location, then the system does not associate location data of the first geographic location with the post (e.g., in system memory, in a dataset, etc.).

Figure 18:
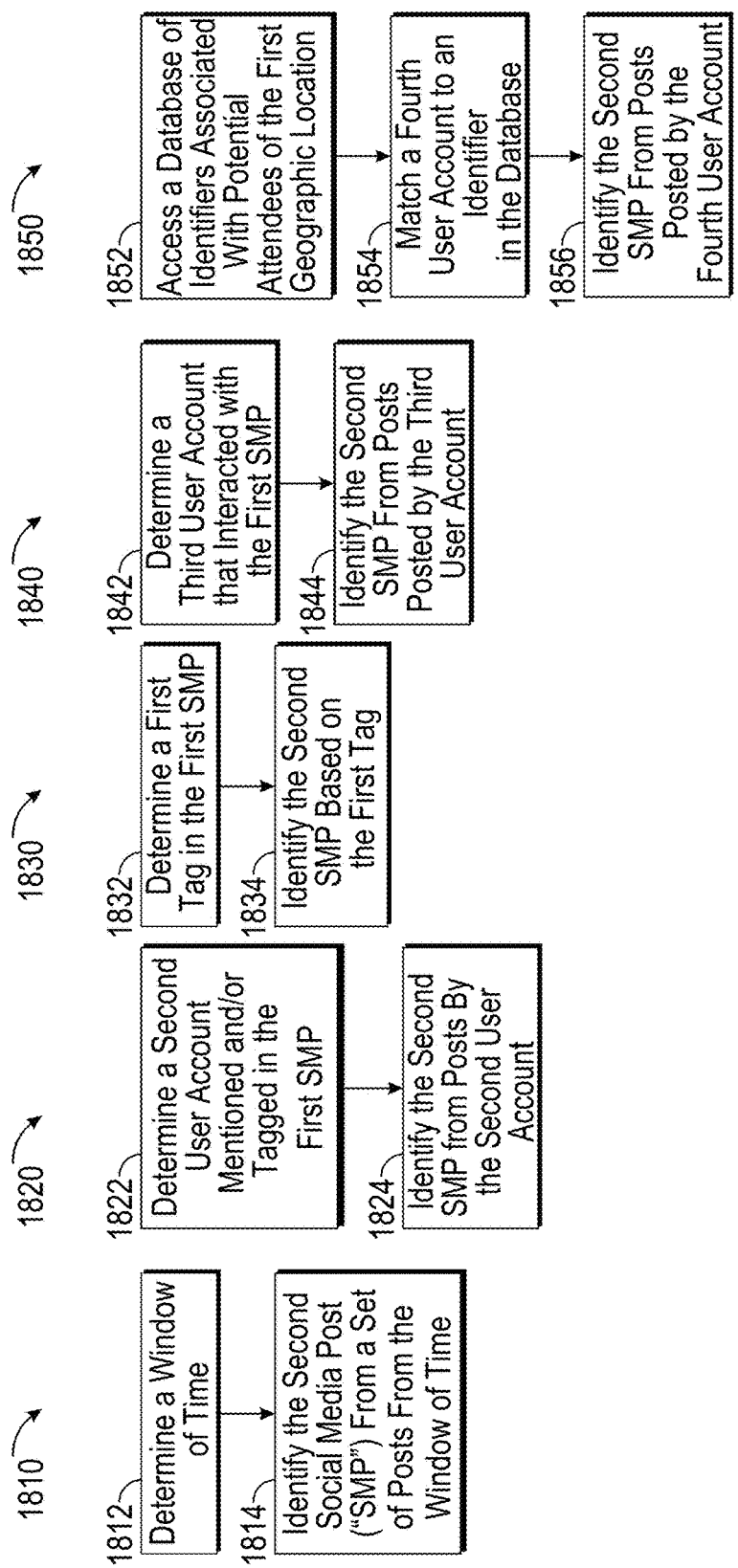
FIG. 18 depicts a flow diagram illustrating an exemplary process for determining a geographic location of a social media post in accordance with some embodiments.

FIG. 18 depicts exemplary processes for determining a second social media post related to a first social media post. One or more of processes 1810, 1820, 1830, 1840, and 1850 can be used at block 1704 of process 1700 (FIG. 17).

Blocks 1812 to 1814 of process 1810 depict a technique that utilizes a window of time when determining a related social media post. At block 1812, the system determines a window of time. In some embodiments, the window of time corresponds to the length of an event at the geographic location. For example, if an event at a geographic location is scheduled to last for a 4 hour window from 5:00 PM to 9:00 PM, then the window during which social media posts related to the event may be 6 hours (e.g., 4:00 PM to 10:00 PM).

At block 1814, the system identifies the second social media post from a set of posts from the window of time. For example, if the first social media post is post 4 of dataset 600 of FIG. 6, which was posted at 7:30 PM on Aug. 13, 2018, then the social media post 3 would satisfy the window of time criteria given above because it was posted at 7:15 PM on Aug. 13, 2018.

Blocks 1822 to 1824 of process 1820 depict a technique that utilizes user accounts referenced in the first social media post. At block 1822, the system determines a second user account mentioned and/or tagged in the first social media post, wherein the first social media post was posted by a first user account. For example, if post 3 of dataset 600 was posted by user "Cindy J." (e.g., the first user account), the system determines that the user "Alex B." was tagged and mentioned in the post (e.g., and thus Alex B. is the second user account).

At block 1824, the system identifies the second social media post from posts posted by the second user account. For example, the second social media post would be identified by posts made by the user account Alex B. For instance, the system identifies posts by Alex B. that were posted around the same time as the first social media post (e.g., within a window of time).

Blocks 1832 to 1834 of process 1830 depict a technique that utilizes hashtags to identify a second social media post. At block 1832, the system determines a first tag. For example, the system determines that the post 4 of dataset 600 includes the hashtags "#Gametime" and "#GoTeam".

At block 1834, the system identifies the second social media post based on the first tag. For example, the system identifies post 6 of dataset 600 as the second social media post, which includes the common hashtag "#GoTeam".

Blocks 1842 to 1844 of process 1840 depict a technique that utilizes user accounts that interacted with a first social media post. At block 1842, the system determines a user account that interacted with the first social media post. For example, if a user account (e.g., Alex B.) likes, shares, comments, or otherwise interacts publically with the first social media post (e.g., posted by Cindy J.), the system determines that Alex B. interacted with the first social media post.

At block 1844, the system identifies the second social media post from posts posted by the identified user account. In this example, the system identifies a post that was made by Alex B. In some examples, the identified post was posted around the same time as the first social media post (e.g., within a window of time).

Blocks 1852 to 1856 of process 1850 depict a technique that utilizes a database of identifiers associated with known potential attendees at a geographic location of interest. At block 1852, the system accesses a database of identifiers associated with potential attendees of the first geographic location. In some embodiments, potential attendees are purchasers of a ticket to an event at the geographic location. In some embodiments the identifiers are email addresses, user names, account names, or other identifiable monikers that are provided during a ticket purchase transaction. For example, if a customer purchases a ticket from an online ticket seller, the user may have created an account (e.g., with a user name) or provided an email address (e.g., at which to receive the tickets). If the user also maintains a social media account (e.g., user account) that shares the email address, and the social media posts shared are accessible (e.g., publically-viewable), then the system determines that the user (of the user account) is likely to physically be in attendance at the geographic location at the time of the event.

At block 1854, the system matches a user account to an identifier in the database. As described above, the system can determine if potential attendees (e.g., ticket purchasers) have a social media user account that is publically-viewable and that matches information provided during the ticket purchase.

At block 1856, the system identifies the second social media post from posts posted by the identified user account. For example, if the user account (Cindy J.) associated with post 3 of database 600 had purchased the ticket to the event using an email address common to her social media account, and the social media account was publically-viewable, then the related post is identified based on this information.

Figure 19:
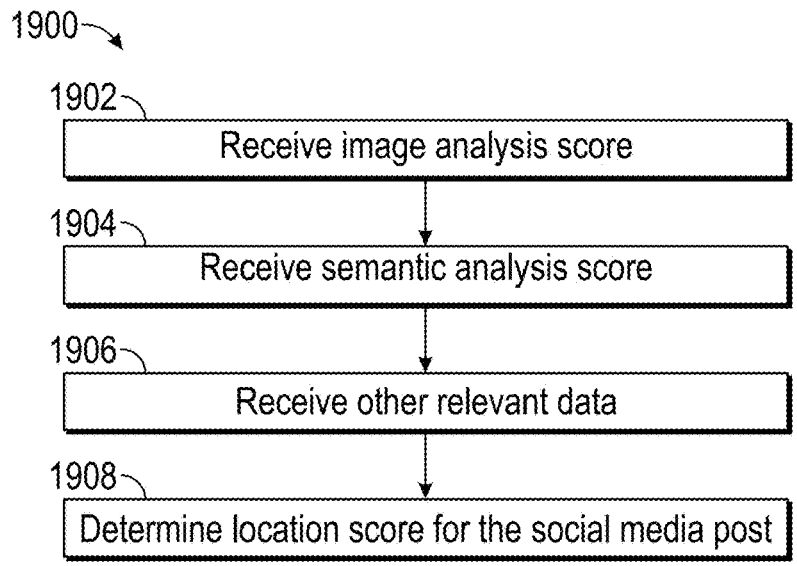
FIG. 19 depicts a flow diagram illustrating an exemplary process for determining a location score for social media posts in accordance with some embodiments.

FIG. 19 depicts an exemplary process 1900 for determining a location score of a target social media post in accordance with some embodiments. At block 1902, the system receives an image analysis score. For example, the system analyzes image 802 of FIG. 8A and may produce an image analysis score of between 0 (e.g., no similarity to a database of known images) and 1 (e.g., a perfect match to one or more images in the database of known images). For the sake of example, the image 802 produces an example image analysis score of 0.4, around the middle of this range, when image classification is performed based on the dataset of images in FIG. 5. Image 802 includes some features that match the images depicted in FIG. 5, namely structural elements of City Arena (e.g., the upper-level seats) as well as fans in the seats (e.g., dressed in team colors). However, image 802 does not include a direct view of the basketball court and/or other identifiable team logo, so its image analysis score falls somewhere in the middle of the 0 to 1 range. In some examples, if the target image includes a clear shot of the basketball court and team logo (e.g., image 806 of FIG. 8B), then the image analysis score would be relatively higher (e.g., 0.8).

In some embodiments, if a target social media post (e.g., a social media post of unknown location) does not include an image, an image analysis score is not taken into account (e.g., can be set to zero or assigned no weight).

In some embodiments, the image analysis score corresponds to the output of an image classifier. In some embodiments, the image analysis score corresponds to the output of a plurality of image classifiers. In some examples, the image analysis score is a value (or sum of values) that are output from one or more image classifiers. In some examples, the image analysis score is a function of the outputs from one or more image classifiers (e.g., the output is scaled; simple voting scheme).

At block 1904, the system receives a semantic analysis score. For example, the text of the social media post (post 3 of dataset 600) corresponding to image 802 of FIG. 8A reads "At the game with Alex B." The mention of the word "game" and/or the phrase "at the game" will generate a high semantic analysis score (e.g., 0.7) when analyzed for similarity to the text of the posts in dataset 300.

In some embodiments, the semantic analysis score corresponds to the output of a semantic analysis process. In some embodiments, the semantic analysis score corresponds to the output of a plurality of semantic analysis processes.

At block 1906, the system receives other relevant data. For example, other relevant data can include any data that the system is programmed to take into account that will affect the location score. For instance, other relevant data can include one or more of: time (e.g., during an event or other window of time that includes a known geotagged post), geo-spatial temporal statistics, social graph connections (e.g., associations between users based on available datasets analysis or message on social media networks), and other relevant data.

As an example of using geo-spatial temporal statistics as relevant data, a geographic location (e.g., a city) is divided into square regions, and a period of time (e.g., 24 hours) is divided into intervals of time. This will form a space-time coordinate system comprised of space-time "cubes". Each user account can have a trajectory of "cubes" for their daily activity (e.g., as they post around the city over the course of the day). Similarly, an event can have a trajectory (e.g., a straight line if the event is at the same location, or a series of adjacent "cubes" for an event like a parade that moves around the city). Users who are (or have been) at a given event (at a geographic location) have space-time trajectories that intersect with the event's trajectory. These trajectories (e.g., user, event) and their intersections can be utilized, for example, as part of a location prediction system.

As an example of using social graph connections, and referring back to post 3 of dataset 600, if the user account Alex B. that is mentioned/tagged in the text of the post also checked into the game with a (geotagged) social media post, then this social graph connection information increases the likelihood that the user (Cindy J.) that posted target social media is physically at the event venue (e.g., because Alex B. is known to be at the game).

In some embodiments, the system assigns the other relevant data a score. For example, the social graph connection above between Alex B. and Cindy J. could be assigned as score of 0.1, which reflects the increase in likelihood that Cindy J. is posting from the basketball game.

In some embodiments, the system uses the other relevant data to adjust one or more of the image analysis score, semantic analysis score, or a combination of the image analysis and semantic analysis scores. For example, the other relevant data can be used to determine a scaling factor, which is multiplied by the analysis scores. For instance, if the scaling factor is 1.05, then a location score of 1.1 becomes 1.155.

At block 1908, the system determines a location score for the social media post. For example, the system processes one or more of the image analysis score, the semantic analysis score, and the other relevant data into a location score. In some examples, each score is simply added up. In this example, addition of the three scores would be (0.4+0.7+0.1=1.2).

In some embodiments, the location score is a weighted combination of its component scores. For example, the image analysis can be given a higher weight so that it affects the location score more strongly. For instance, using the above example, the location score is now given a higher weighting (0.5) as compared to the two other factors (each weighted at 0.25): ((0.4)*(0.5)+(0.7)*(0.25)+(0.1)*(0.25)=0.4). As can be seen, the heavier weighting of the image score causes the location score to be lowered to 0.4.

The location score can be used to assign a geographic location to a target social media post (e.g., as described above with reference to process 1700 of FIG. 17).

4. Using Data Representing Social Media Posts Having a Resolved Location

Determining a physical, geographic location of a social media post is very valuable, for example, to a business that has a customer-facing physical presence (e.g., a geographic location such as a venue, storefront, event space, etc.). The geographic location information can be further utilized to generate new and useful data. Thus, by using a small pool of data (e.g., geotagged posts) to derive a larger pool of data, more content is available to the system for performing further analysis, engaging with more users, and the like.

Described below are several exemplary techniques for using geographic location data associated with social media posts to cause a system to take action, to derive additional useful data, or both.

a. Engaging with User Accounts

Using location resolution to determine geographic location data for social media posts that would otherwise be overlooked provides the ability to engage with a broader base of users and generate more useful data regarding user engagement.

Figure 20:
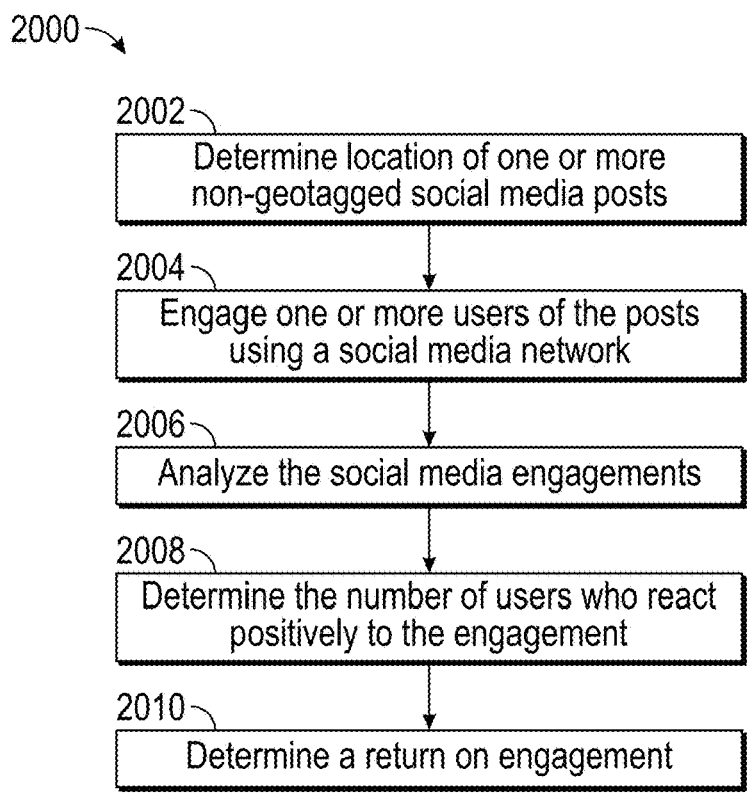
FIG. 20 depicts a flow diagram illustrating an exemplary process for determining a return on engagement in accordance with some embodiments.

FIG. 20 depicts an exemplary process 2000 for determining a Return on Engagement. A Return on Engagement ("ROE") is a measure of users who react with positive actions after being proactively engaged on social media, and thus the effectiveness of social media campaigns.

At block 2002, the system determines a location of one or more non-geotagged social media posts. For example, the system can perform one or more of the location resolution processes described above (e.g., processes 1700, 1800) to determine a geographic location for one or more social media posts that do not include explicit associated location data. In some embodiments, the system accesses one or more social media posts (e.g., data, or a dataset, representing the posts) whose locations have previously been determined.

At block 2004, the system engages one or more user accounts of the posts using a social media network. For example, the system (e.g., automatically and proactively) interacts with the social media user account whose social media post was identified as corresponding to a geographic location. In some embodiments, engaging can include one or more of: creating a post on the user account's page (e.g., on their "timeline", "wall", or the like), interacting with a post created by the user account (e.g., by marking the post with a "like", "favorite", "heart", "retweet", or the like), com-menting on a post by the user account, sending the user account a private message, a combination of one or more of these actions, or other actions available on social media networks that allow interaction between user accounts.

At block 2006, the system analyzes the social media engagements. In some embodiments, analyzing the social media engagements includes monitoring the engagement for a user response or action.

At block 2008, the system determines the number of users who react positively to the engagement. For example, positive reactions include: the user account posting a comment mentioning the social media user account that engaged with them (e.g., the venue's social media profile), the user "following" the social media user account that engaged with them, the user account creating a post again mentioning the social media account that engaged with them, or the like.

At block 2010, the system determines a Return on Engagement. In some embodiments, the ROE is:

$$ROE = \frac{\text{(Total \# of user accounts who react to an engagement with positive action)}}{\text{(Total \# of user accounts engaged with)}}$$

b. Determining a Social Activity Index for a Geographic Location

Using location resolution to determine geographic location associated with social media posts that would otherwise be overlooked by other techniques provides the ability to derive and create actionable data that otherwise would not be available.

Figure 21:
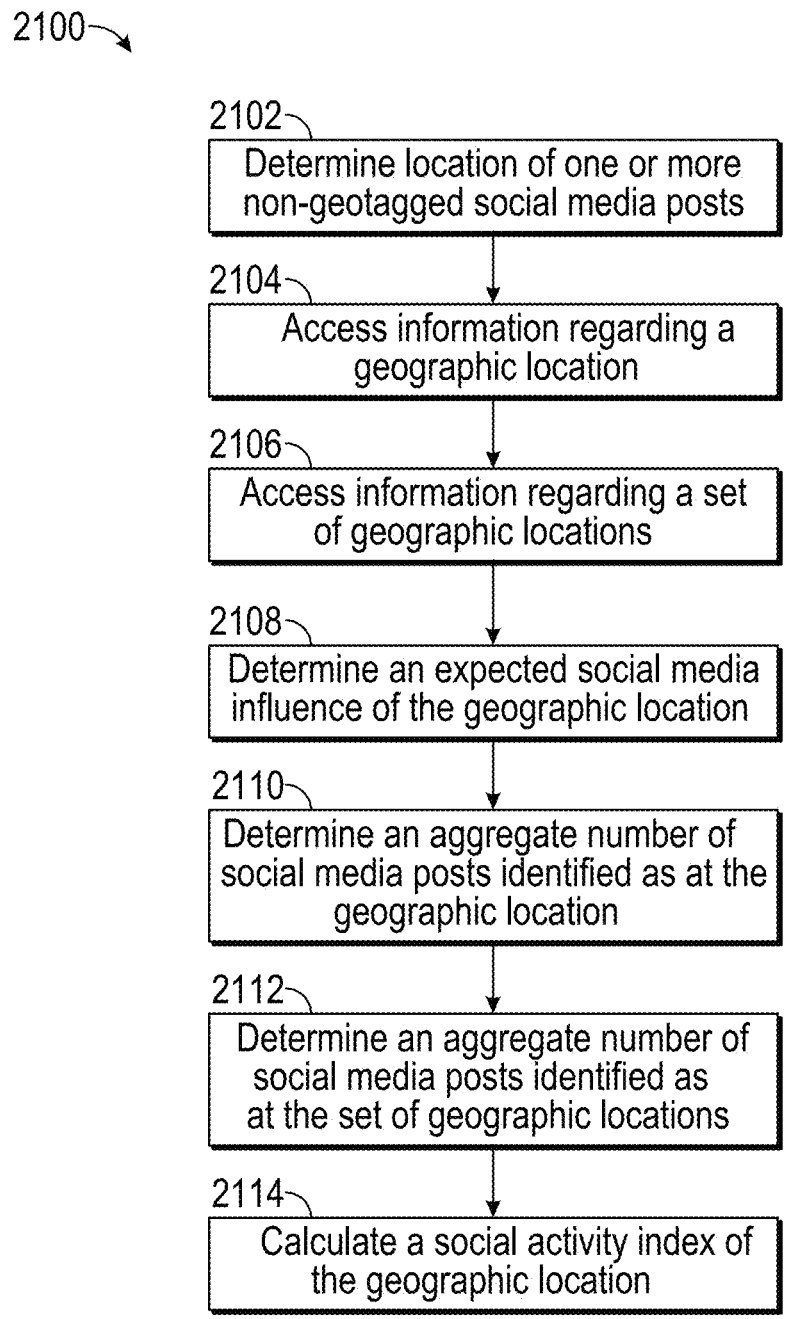
FIG. 21 depicts a flow diagram illustrating an exemplary process for determining a social activity index in accordance with some embodiments.

FIG. 21 depicts an exemplary process 2100 for determining a Social Activity Index for a geographic location. A Social Activity Index ("SAI") is a measure of the influence that a geographic location exhibits on social media, relative to its size with regard to similar geographic locations. The SAI standardizes the measurement of social activity from events and venues.

At block 2102, the system determines a location of one or more non-geotagged social media posts. For example, the system can perform one or more of the processes described above (e.g., processes 1700, 1800) to determine an assigned geographic location for one or more social media posts that do not include explicit associated location data. In some embodiments, the system accesses one or more social media posts (e.g., data, or a dataset, representing the posts) whose locations have previously been determined.

At block 2104, the system accesses information regarding a geographic location. In some embodiments, the information regarding the geographic location includes a measure of the physical capacity of the geographic location. For example, if the geographic location is a hotel, the capacity measure can be the total number of hotel rooms. Likewise, if the geographic location is a venue such as a stadium or an arena, the capacity measure can be the total number of seats in the venue. In some embodiments, the information regarding the geographic location includes a measure of the amount of social media activity generated from (or related to) the geographic location. For example, this can be the total number of social media posts associated the geographic location. For instance, the total number of posts can be the sum of the number of geotagged posts and the number of non-geotagged posts whose location has been resolved.

At block 2106, the system accesses information regarding a set of geographic locations. In some embodiments, the information regarding the set of geographic locations includes a measure of the physical capacity of the set of geographic locations. For example, if the set of geographic locations are hotels, the capacity measure can be the total number of hotel rooms for all of the hotels that are represented within the set of geographic locations. The set of geographic locations can include the geographic location (e.g., from block 2104). In some other examples, if the set of geographic locations are venues such as stadiums or arenas, the capacity measure can be the total number of seats in the venues. In some embodiments, the information regarding the set of geographic locations includes a measure of the amount of social media activity generated from (or related to) the set of geographic locations. For example, this can be the total number of social media posts associated the geographic locations included in the set of geographic locations. For instance, the total number of posts can be the sum of the number of geotagged posts and the number of non-geotagged posts whose location has been resolved.

At block 2108, the system determines an expected social media influence of the geographic location. For example, for the geographic location whose information was accessed at block 2104, the system determines the social media influence expected for the geographic location, based on capacity. For instance, an expected social media influence for the geographic location can expressed as:

$$I_{expected} = \frac{\text{(Capcity measure of the geographic location)}}{\text{(Total capcity measure of the set of geographic locations)}}$$

From the expression above, a geographic location is expected to produce an amount of social media influence relative to a collection of geographic locations (e.g., similar venues) in proportion to its size. For example, if a venue has 10,000 seats, and all similar venues contain a total number of seats 100,000, then the venue would be expected to produce 10% of the social media activity related to the set of venues ($I_{expected}$=0.1). Exemplary expressions are given below for a stadium, and for a hotel. One skilled in the art would recognize that expected influences can similarly be denoted for other types of geographic locations (e.g., venues, events) based on capacity or size.

$$I_{expected,stadium} = \frac{\text{(Total \# of seats in stadium)}}{\text{(Total \# of seats in a set of stadiums)}}$$

$$I_{expected,hotel} = \frac{\text{(Total \# of rooms in hotel)}}{\text{(Total \# of rooms in a set of hotels)}}$$

At block 2110, the system determines an aggregate number of social media posts identified as at the geographic location. For example, the system determines the total number of social media posts (e.g., posts with a geotag and/or a resolved location) posted from (or whose posts relate to) the geographic location (e.g., venue) whose information was accessed at block 2104. In some embodiments, the system determines the total number of social media posts over a predefined period of time. For example, the system may determine the total number of posts in the past 24 hours, 1 week, 1 month, or the like.

At block 2112, the system determines an aggregate number of social media posts identified as at the set of geographic locations. For example, the system determines the total number of social media posts (e.g., posts with a geotag and/or a resolved location) identified as having been posted from (or related to) any of the set of geographic locations. In the venue example, all social media posts from all of the venues in the set are aggregated into a total. In some embodiments, the system determines the total number of social media posts over a predefined period of time. For example, the system may determine the total number of posts in the past 24 hours, 1 week, 1 month, or the like.

At block 2114, the system calculates a social activity index of the geographic location. In accordance with some embodiments, the SAI can be calculated as follows:

$$SAI = \frac{(I_{activity})}{(I_{expected})}, \text{ wherein,}$$

$$I_{activity} = \frac{\text{(Aggregate number of social media posts identifed as at the geographic location)}}{\text{(Aggregate number of social media posts identifed as at the set of geographic locations)}}$$

For instance, in the example above, the stadium has an $I_{expected}$=0.1. Thus, it is expected that the proportion of social media activity generated from the stadium will be 10% of all activity for a set of stadiums (i.e., that $I_{activity}$ will also be equal to 0.1). However, if the aggregate number of posts identified as at (or related to) the stadium is 20% of all the aggregate number of posts identified as at (or related to) a set of stadiums (that includes the stadium), then $I_{activity}$=0.2. Thus, according to the expression above, the stadium would have an SAI=(0.2)/(0.1)=2. In some examples, an SAI of greater than 1 indicates a higher than expected amount of social activity that originates from or is related to the geographic location.

c. Determining a Social Influence Index for a Geographic Location

Using location resolution to determine geographic location associated with social media posts that would otherwise be overlooked by other techniques provides the ability to derive and create actionable data that otherwise would not be available.

Figure 22:
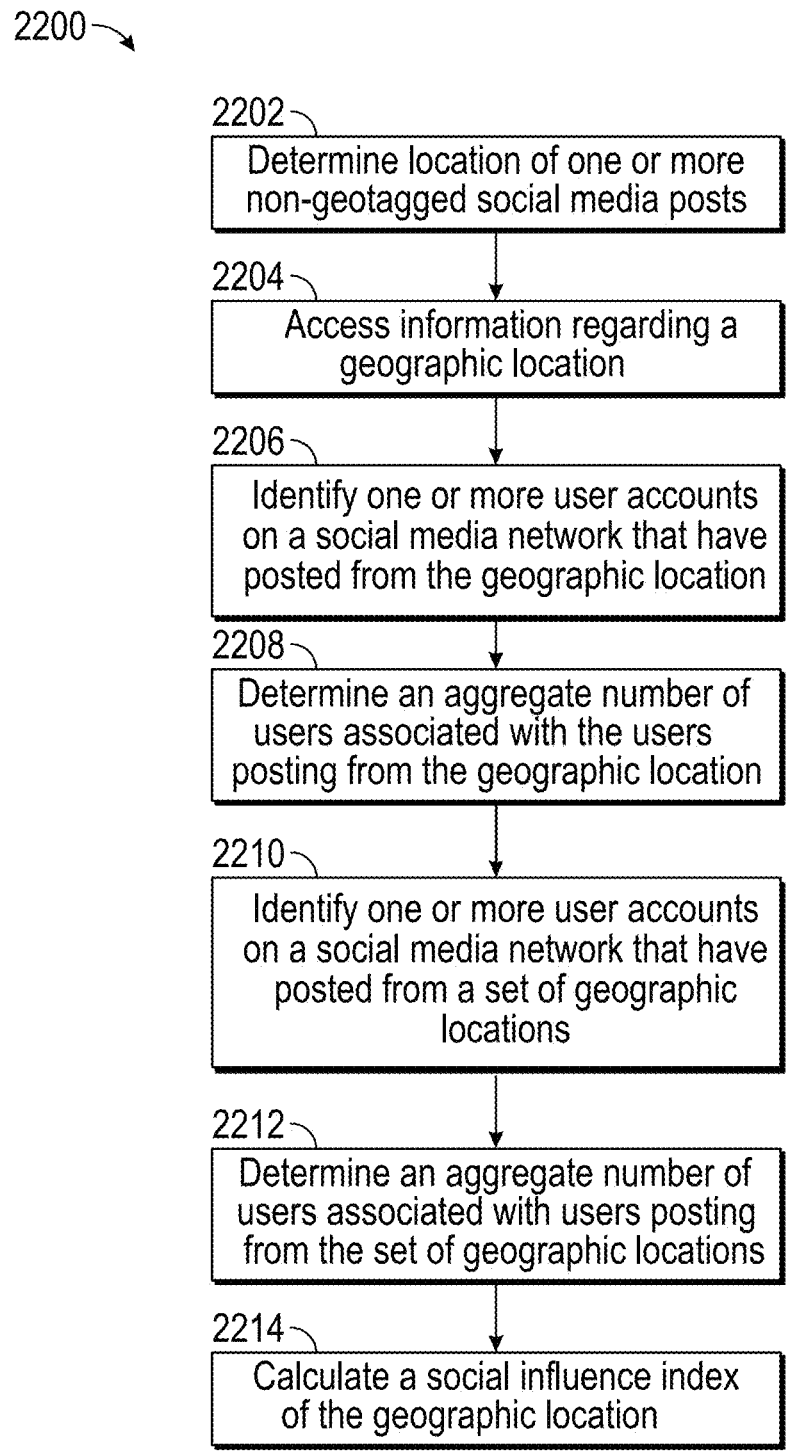
FIG. 22 depicts a flow diagram illustrating an exemplary process for determining a social influence index in accordance with some embodiments.

FIG. 22 depicts an exemplary process 2200 for determining a Social Influence Index for a geographic location. A Social Influence Index ("SII") is a measure of the influence that users posting from (or about) a geographic location exhibit on social media, relative to its size and/or similar geographic locations. This is related to the social "reach" that a geographic location has—e.g., the number of users that can be reached through social media engagement within one degree of separation from the geographic location on one or more social media networks. The SII standardizes the measurement of social influence (potential reach) of events and venues.

At block 2202, the system determines a location of one or more non-geotagged social media posts. For example, the system can perform one or more of the processes described above (e.g., processes 1700, 1800) to determine an assigned geographic location for one or more social media posts that do not include explicit associated location data. In some embodiments, the system accesses one or more social media posts (e.g., data, or a dataset, representing the posts) whose locations have previously been determined.

At block 2204, the system accesses information regarding a geographic location. In some embodiments, the information regarding the geographic location includes a measure of the physical capacity of the geographic location.

At block 2206, the system identifies one or more user accounts on a social media network that have posted from the geographic location. For example, the system determines all user accounts that have created public social media posts at (e.g., geotagged) or related to a venue. In some embodiments, the system identifies user accounts from a plurality of social media networks.

At block 2208, the system determines an aggregate number of user accounts that are associated with the user accounts that have posted from (or about) the geographic location. For example, the system determines an aggregate number of one or more of the following: followers, friends, subscribers, or the like, of the user accounts that have posted from the geographic location.

At block 2210, the system identifies one or more user accounts on a social media network that have posted from a set of geographic locations. For example, the system determines all user accounts that have created public social media posts at (e.g., geotagged) a set of similar venues. In some embodiments, the system identifies user accounts from a plurality of social media networks.

At block 2212, the system determines an aggregate number of user accounts that are associated with the user accounts that have posted from the set of geographic locations. For example, the system determines an aggregate number of one or more of the following: followers, friends, subscribers, or the like, of the user accounts that have posted from the set of geographic locations.

At block 2214, the system calculates a Social Influence Index of the geographic location. In accordance with some embodiments, the Social Influence Index ("SII") can be calculated as follows:

$$SII = \frac{(I_{influence})}{(I_{expected})}, \text{wherein,}$$

$$I_{influence} = \frac{(\text{Aggregate \# of user accounts associated with the user accounts that have posted from the geographic location})}{(\text{Aggregate \# of user accounts associated with the user accounts that have posted from the set of geographic locations})}$$

For instance, in the example above, the stadium has an $I_{expected}=0.1$. Thus, it is expected that the social influence (reach) of the stadium will be 10% of the influence that a set of stadiums has (i.e., that $I_{influence}$ will also be equal to 0.1). However, if the aggregate number of users reachable by the stadium is 20% of all the users reachable by the set of stadiums (that includes the stadium), then $I_{influence}=0.2$. Thus, according to the expression above, the stadium would have an SII=(0.2)/(0.1)=2. In some examples, an SII of greater than 1 indicates a higher than expected amount of social influence (reach) by a geographic location.

Figure 23:
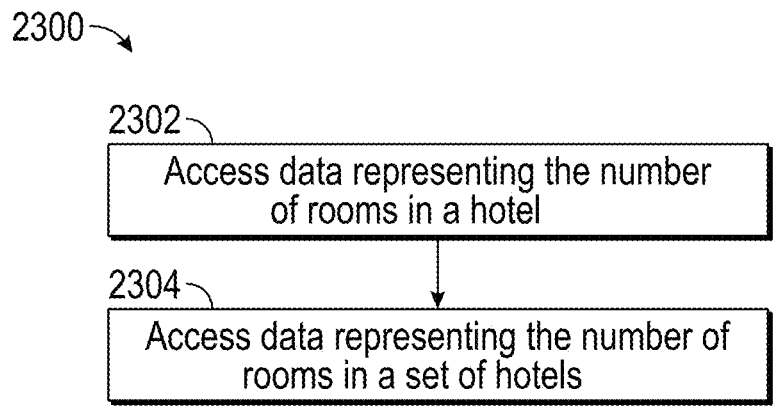
FIG. 23 depicts a flow diagram illustrating an exemplary process for accessing data regarding a geographic location in accordance with some embodiments.

FIG. 23 depicts an exemplary process 2300 for accessing information related to a hotel. As described above with respect to FIGS. 21 and 22, an exemplary geographic location is a hotel, and an exemplary set of geographic locations is a set of hotels. In some embodiments, the system can perform one or all of the steps of process 2300 in conjunction with performing either or both of processes 2100 and 2200.

At block 2302, the system accesses data representing the number of rooms in a hotel. In some embodiments, this data is stored locally (e.g., at the system). In some embodiments, this data is stored remotely (e.g., over a wide area network connection). For example, the data can be accessed from sources available on the Internet, such as hotel websites, travel websites, public records, or the like. In some embodiments, this data is stored locally, and refreshed periodically from one or more of the sources above.

At block 2304, the system accesses data representing the number of rooms in a set of hotels. In some embodiments, this data is stored locally (e.g., at the system). In some embodiments, this data is stored remotely (e.g., over a wide area network connection). For example, the data can be accessed from sources available on the Internet, such as hotel websites, travel websites, public records, or the like. In some embodiments, this data is stored locally, and refreshed periodically from one or more of the sources above.

Figure 24:
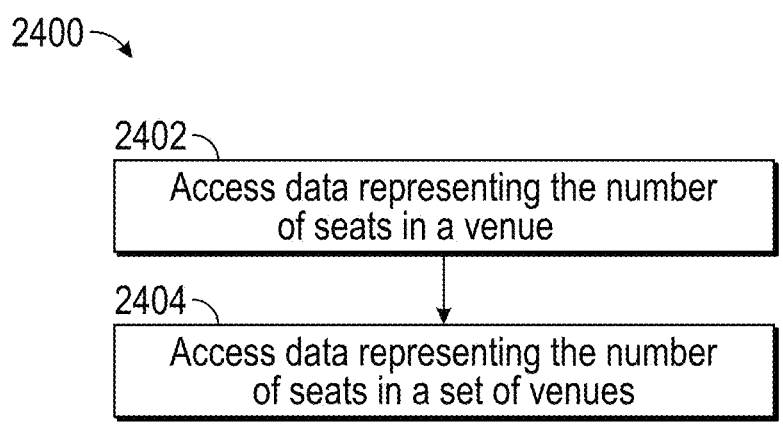
FIG. 24 depicts a flow diagram illustrating an exemplary process for accessing data regarding a geographic location in accordance with some embodiments.

FIG. 24 depicts an exemplary process 2400 for accessing information related to a venue with seats. As described above with respect to FIGS. 21 and 22, an exemplary geographic location is a venue with seats (e.g., a stadium, arena, or the like), and an exemplary set of geographic locations is a set of venues. In some embodiments, the system can perform one or all of the steps of process 2400 in conjunction with performing either or both of processes 2100 and 2200.

At block 2402, the system accesses data representing the number of seats at a venue. In some embodiments, this data is stored locally (e.g., at the system). In some embodiments, this data is stored remotely (e.g., over a wide area network connection). For example, the data can be accessed from sources available on the Internet, such as venue websites, ticket sales websites, public records, or the like. In some embodiments, this data is stored locally, and refreshed periodically from one or more of the sources above.

At block 2404, the system accesses data representing the number of seats in a set of venues. In some embodiments, this data is stored locally (e.g., at the system). In some embodiments, this data is stored remotely (e.g., over a wide area network connection). For example, the data can be accessed from sources available on the Internet, such as venue websites, ticket sales websites, public records, or the like. In some embodiments, this data is stored locally, and refreshed periodically from one or more of the sources above.

d. Generating Reports Using Social Media Post Data

FIGS. 25A-25G depict exemplary representations of analyzed geographic location data as described above. The representations include concepts discussed above, as well as other uses of location data, intended to be within the scope of this disclosure. In some examples, the system determines one or more of the outputs of the data analysis concepts described above and below, and presents the results as a report.

In some embodiments, a report includes one or more of the portions depicted in FIGS. 25A-25G. In some embodiments, the report (e.g., as a graphical user interface) is provided to a requester (e.g., to a venue, via a venue computer system 110 of FIG. 1). In some examples, system provides the report to the venue computer system via an API, a website, or any other appropriate method for exchanging information between computer systems. One skilled in the art would recognize that various methods for providing the information depicted in FIGS. 25A-25G (e.g., graphics and/or text). In some examples, the report is a web portal. In some examples, the report is a web-based application.

Figure 25A:
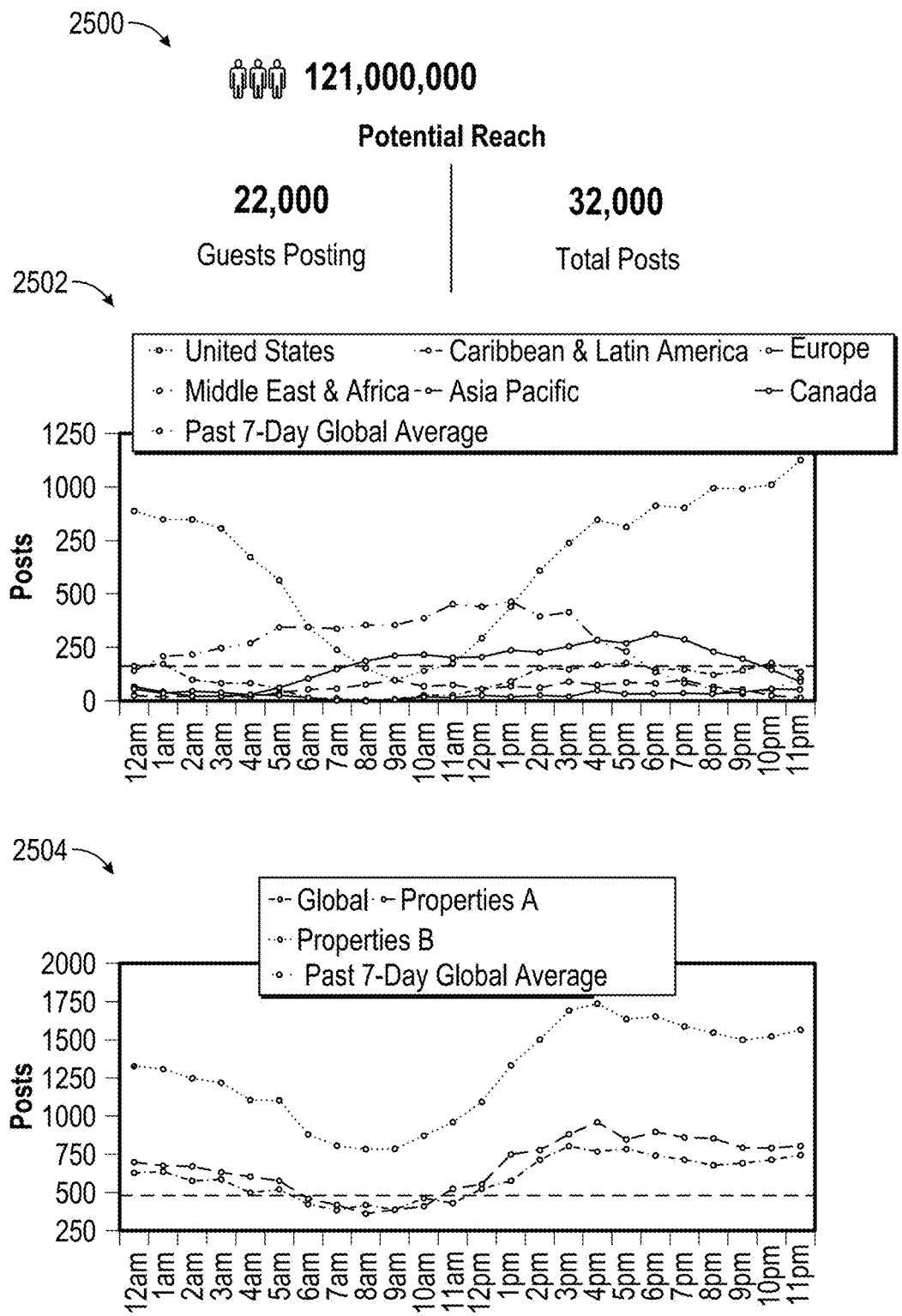

FIG. 25A includes information graphic 2500, which depicts a total potential reach (in number of users) (e.g., 121,000,000), a total number of guests posting (22,000), and a total number of posts (32,000). For example, the total potential reach can be a value equal to the number users posting from one or more properties (geographic locations), as well as followers of those users. The total number of guests (e.g., user accounts) posting can be the number of guests at the one or more properties that have created social media posts at (or related to) a geographic location of the one or more properties. The total number of posts can be the number of posts posted from (or related to) the one or more properties.

FIG. 25A also includes information graphic 2502, which depicts social media activity by region. In this example, if the one or more properties are spread out around the world (e.g., a network of hotels), then the operator of the properties can view social activity broken down by geographic region. Information graphic 2504 of FIG. 25A similarly depicts social media activity by company (e.g., by subsidiary of the operator), which can assist the operator in quantifying the user engagement with various business segments.

Figure 25B:
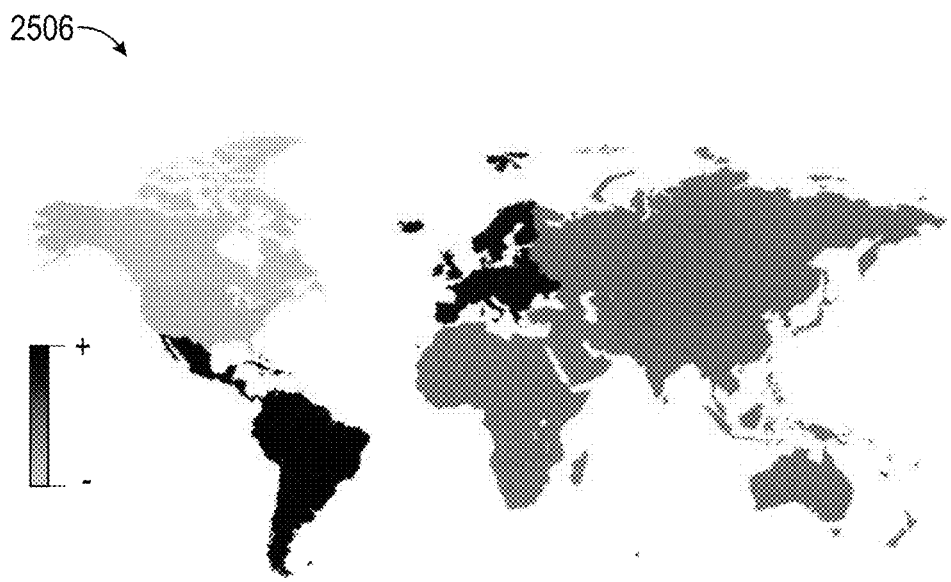

FIG. 25B includes information graphic 2506, which depicts a map and table showing a Regional Influence Index ("RII") for a variety of regions. An RII is similar to the SII described above, but is a measure of the social reach (e.g., users and their followers) on a regional basis. In other words, the RII compares the percentage of reach generated from a region to the corresponding percentage of global capacity (e.g., total number of hotel rooms globally, from all hotels or just those operated by the operator).

FIG. 25C includes information graphic 2508, which depicts popular topics and words that have been identified from social media activity that originated from the geographic locations of two groups of properties, Properties A and Properties B. Information such as that shown in graphic 2508 provides analytics that are specific to the geographic locations of specific properties. Such granular information is extremely valuable because, for example, the operator can tailor social media engagement and other customer-facing activity based on the data, which would otherwise be unavailable. For example, if a particular topic (e.g., Miami Festival 2018) is trending among guests at a single property, the operator can see this information and respond (e.g., by engaging the user on social media to provide a coupon for use at the Festival). Thereby the user's experience is improved (e.g., automatically) and the operator's goodwill increased.

FIG. 25D includes information graphic 2510, which depicts a collection of individual geographic locations (e.g., hotels), and the number of social media posts that are being generated from each. As described above, this provides an operator the ability to view the aggregate amount of social activity on a property-by-property basis.

FIG. 25E includes information graphic 2512, which depicts a plurality of social media user accounts and their number of followers. In this example, these user accounts represent users with a large amount of influence (e.g., followers) that are posting from geographic locations. A property operator can engage with identified user accounts of high influence in order to maximize opportunities to engage with the larger network of the followers of these accounts.

Figure 25F:
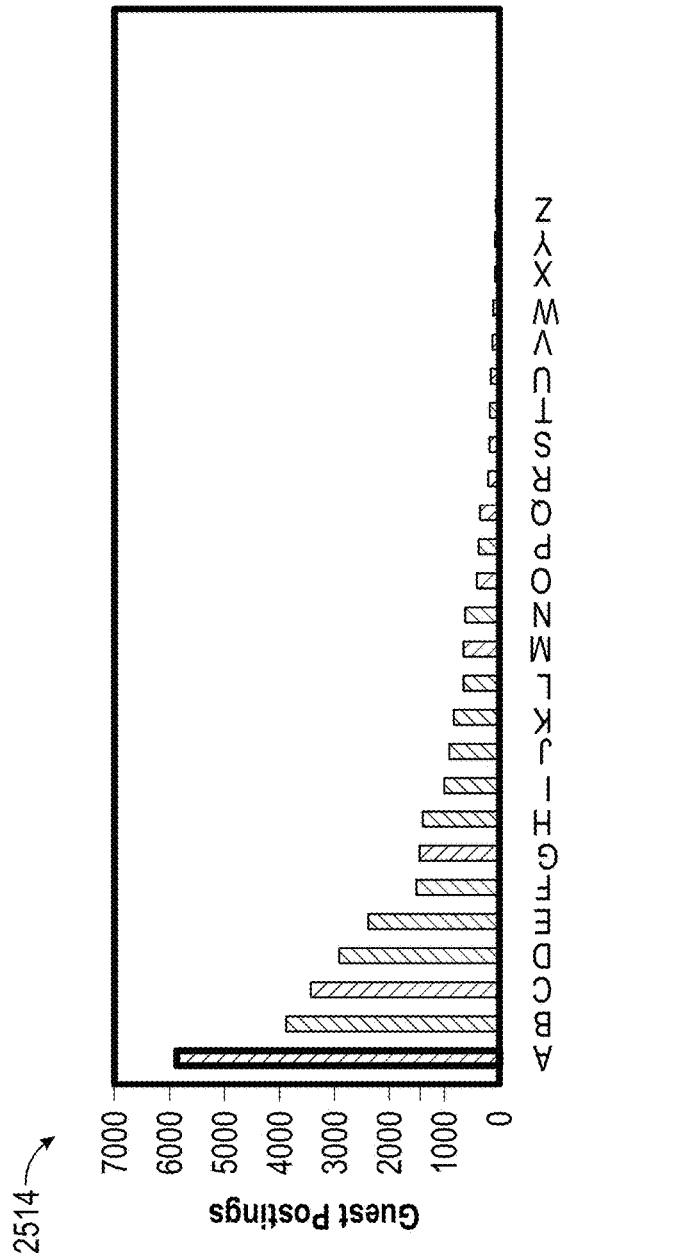

FIG. 25F includes information graphic 2514, which depicts a graphical view of the Social Activity Indices of various geographical locations (e.g., hotels A through Z).

Figure 25G:
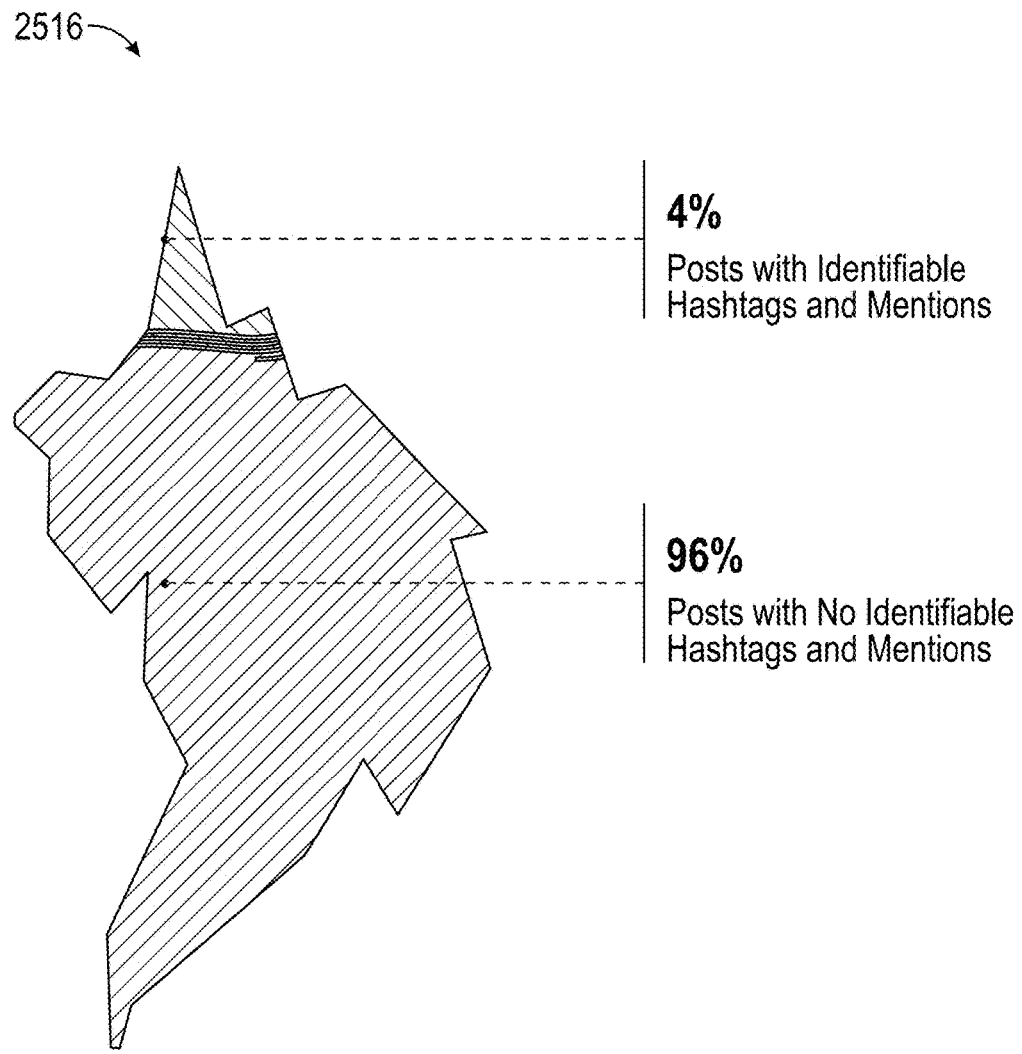

FIG. 25G includes information graphic 2516, which depicts a graphical view (resembling an iceberg) of the percentage of social media posts with identifiable hashtags and mentions (4% in this example) and the percentage of posts with no identifiable hashtags or mentions (96% in this example) for an exemplary set of data. As shown, the vast majority (e.g., 96%) of social media posts can otherwise go unnoticed by operators of geographic locations such as venues, hotels, stadiums, and the like. Location resolution, and the techniques related thereto described above, can be used to create and provide useful data that would otherwise not exist.

Figure 26:
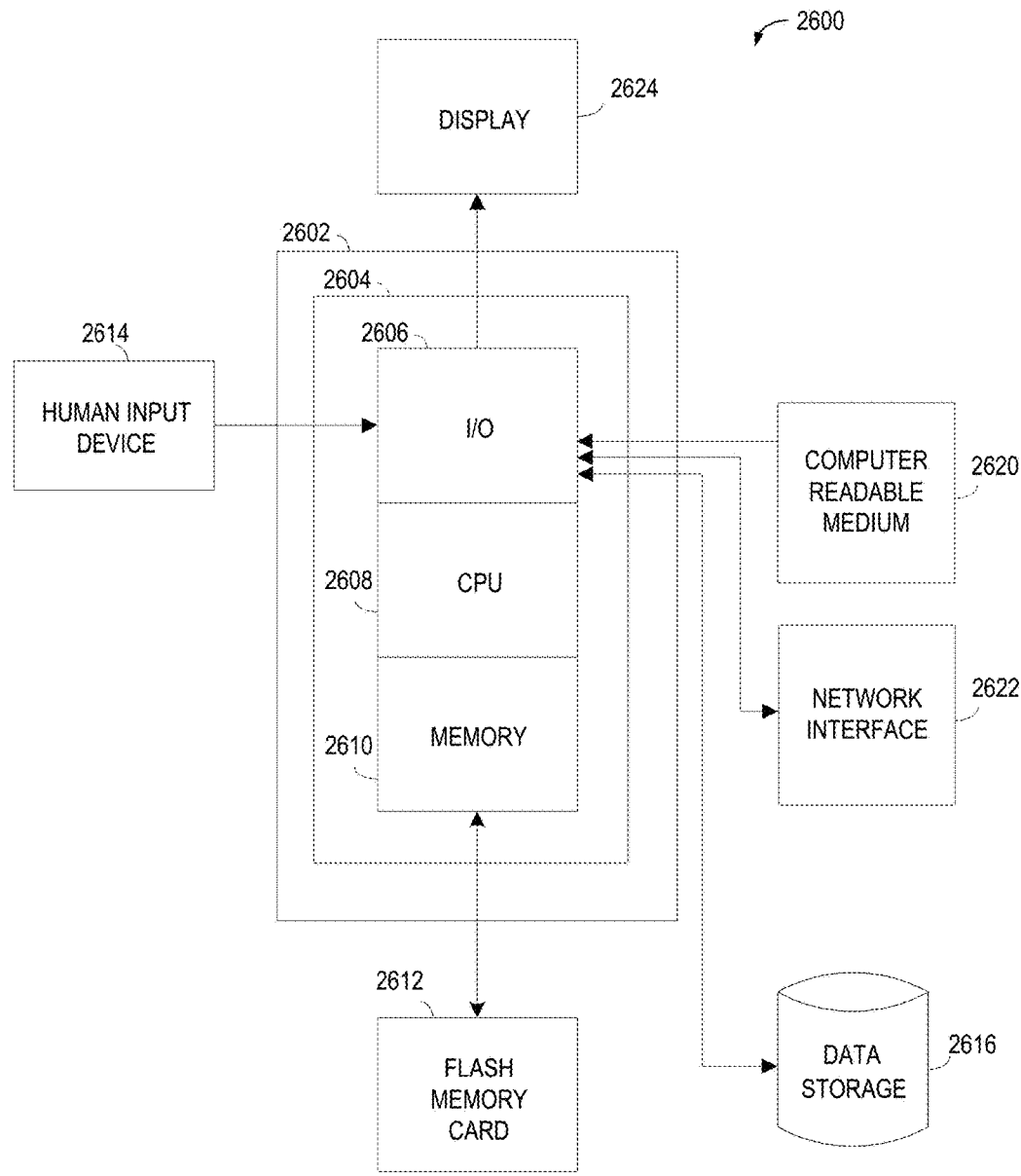
FIG. 26 illustrates a functional block diagram of a computing system in accordance with some embodiments.

Attention is now directed to FIG. 26, which illustrates exemplary computing system 2600 which can be used as a computer system for a venue and to carry out, for example, any of the processes described above and depicted in FIGS. 2 and 9-24. In addition, computing system 2600 can be used to facilitate the provision of the exemplary user interfaces and datasets described above with respect to FIGS. 3-8. Further, computing system 2600 can be used as any of the devices, servers, or systems depicted in network diagram 100 (FIG. 1).

Exemplary computing system 2600 includes a motherboard 2602 having I/O section 2606, one or more central processing units (CPU) 2608, and memory section 2610. Memory section 2610 can be based on various memory modules, such as DIMM memory modules. Memory section 2610 also can be operatively coupled, directly or indirectly through I/O section 2606, with other memory modules, such as flash memory card 2612, a USB memory stick, and the like. I/O section 2606 is operatively coupled with display 2624, human input device 2614, network interface 2622, and data storage unit 2616. Data storage unit 2616 can be a disk drive, solid-state storage device, internet-based (e.g., cloud) storage, and the like. Network interface 2622 permits computing system 2600 to communicate with a computing device, system, and or server such as those depicted in FIG. 1 and discussed above. Computing system 2600 can exclude one or more of the components listed above, and can include other components not depicted.

Computing system 2600 can have computer-executable instructions for performing the above-described techniques, including the processes described above and depicted in FIGS. 2 and 9-24. Such computer-executable instructions may be stored in memory section 2610. Memory section 2610 may obtain the computer-executable instructions from various sources including flash memory 2612, data storage unit 2616, computer-readable medium 2620, network interface 2622, and so forth. Data storage unit 2616 may itself be, or may be a device configured to read from, a non-transitory computer-readable medium 2620 that is used to store (e.g., tangibly embody) one or more computer programs for performing the above-described techniques and processes. The computer program may be written using technologies such as C, Java, JavaScript, HTML5, Python, PHP, MySQL, Android software toolkit ("STK") made by Google Inc. of Mountain View, Calif., and/or iOS software development toolkit made by Apple Inc. of Cupertino, Calif., or the like.

Aspects of the embodiments disclosed above can be combined in other combinations to form additional embodiments. Accordingly, all such modifications are intended to be included within the scope of this technology.

What is claimed is:

1. A computer-implemented method for resolving geographic location of social media posts to determine if they are associated with a first geographic location, the method comprising:

accessing, by one or more processors, a dataset representative of social media posts identified as including geographic location data identifying the first geographic location, wherein the dataset includes data representing a first social media post, wherein the data representing the first social media post includes geographic location data identifying the first geographic location;

identifying, by one or more processors, a plurality of candidate social media posts that are related to one or more of the social media posts represented by the dataset, wherein the candidate social media posts include a second social media post related to the first social media post;

accessing, by one or more processors, data representing the plurality of candidate social media posts including data representing the second social media post, wherein the data representing the plurality of candidate social media posts does not include geographic location data identifying the first geographic location;

analyzing, by one or more processors, the data representing the plurality of candidate social media posts based at least in part on the dataset representative of social media posts identified as including geographic location data identifying the first geographic location, comprising:

analyzing, by one or more processors, the data representing the second social media post, wherein the data representing the second social media post includes an image, and wherein analyzing the data representing the second social media post comprises:

applying, by one or more processors, a computer vision classification algorithm to the image of the data representing the second social media post to determine a first class confidence score;

if the first class confidence score for the image of the data representing the second social media post exceeds a threshold first class confidence score, classifying the image of the second social media post as matching the first class, wherein the location score is determined based at least in part on the classification of the image of the second social media post as matching the first class; and if the first class confidence score for the image of the data representing the second social media post does not exceed the threshold first class confidence score, forgoing classifying the image of the second social media post as matching the first class;

determining, by one or more processors, a location score based at least in part on the analysis of the data representing the second social media post; and if the location score for the data representing the second social media post exceeds a threshold location score, associating the second social media post with the first geographic location.

2. The method according to claim 1, wherein a first user account posted the first social media post, and wherein identifying the plurality of candidate social media posts that include the second social media post related to the first social media post comprises:

determining a window of time based on a time associated with the first social media post; and identifying one or more social media posts posted by the first user account during the window of time, wherein the one or more social media posts posted by the first user account during the window of time includes the second social media post.

3. The method according to claim 1, wherein a first user account posted the first social media post, and wherein identifying the plurality of candidate social media posts that include the second social media post related to the first social media post comprises:

determining that a second user account is mentioned or tagged in the first social media post; and identifying one or more social media posts posted by the second user account, wherein the one or more social media posts posted by the second user account includes the second social media post, and wherein the first and second user accounts are different.

4. The method according to claim 1, wherein identifying the plurality of candidate social media posts that include the second social media post related to the first social media post comprises:

determining that the first social media post includes a first tag; and identifying the second social media post based on the first tag, wherein the second social media post includes the first tag.

5. The method according to claim 1, wherein a first user account posted the first social media post, and wherein identifying the plurality of candidate social media posts that include the second social media post related to the first social media post comprises:

determining that a third user account interacted with the first social media post; and identifying one or more social media posts posted by the third user account, wherein the one or more social media posts posted by the third user account includes the second social media post, and wherein the first and third user accounts are different.

6. The method according to claim 1, wherein identifying the plurality of candidate social media posts that include the second social media post related to the first social media post comprises:

accessing a database of identifiers associated with users previously identified as likely to be located at the first geographic location;

matching a fourth user account to an identifier in the database; and identifying one or more social media posts posted by the fourth user account, wherein the one or more social media posts posted by the fourth user account includes the second social media post.

7. The method according to claim 1, wherein analyzing the data representing the plurality of candidate social media posts that include the second social media post comprises:

performing, by one or more processors, semantic analysis to determine a semantic similarity score between the second social media post and at least a portion of the dataset representative of social media posts identified as including geographic location data identifying the first geographic location;

wherein the location score is determined based at least in part on the semantic similarity score.

8. The method according to claim 1, further comprising:

if the location score for the data representing the second social media post exceeds the threshold location score, adding the data representing the second social media post to the dataset representative of social media posts identified as including geographic location data identifying the first geographic location.

9. The method according to claim 1, wherein the computer vision classification algorithm includes one or more of: a nearest-neighbor classification algorithm and an artificial neural network classification algorithm.

10. The method according to claim 1, further comprising:
if the location score for the data representing the second social media post exceeds the threshold location score, using the data representing the second social media post to update the computer vision classification algorithm.

11. The method according to claim 10, further comprising:
accessing, by one or more processors, data representing a third social media post, wherein the data representing the third social media post does not include geographic location data identifying the first geographic location, and wherein the data representing the third social media post includes an image;
applying, by one or more processors, the updated computer vision classification algorithm to the image of the data representing the third social media post.

12. The method according to claim 1, wherein the computer vision classification algorithm relies on at least one image that matches the first class and that is not associated with the first geographic location.

13. The method according to claim 1, further comprising:
if the location score for the data representing the second social media post does not exceed the threshold location score, forgoing associating the second social media post with the first geographic location.

14. The method according to claim 1, wherein the first geographic location is associated with an event, the method further comprising:
during a time period associated with the event:
identifying the plurality of candidate social media posts that are related to one or more of the social media posts represented by the dataset, wherein identifying the plurality of candidate social media post comprises identifying social media posts that were posted during the time period; and
analyzing the data representing the plurality of candidate social media posts based at least in part on the dataset representative of social media posts identified as including geographic location data identifying the first geographic location.

15. A non-transitory computer-readable storage medium storing one or more programs, the one or more programs comprising instructions for resolving geographic location of social media posts to determine if they are associated with a first geographic location, which, when executed by one or more processors of a system, cause the computing system to:
access a dataset representative of social media posts identified as including geographic location data identifying the first geographic location, wherein the dataset includes data representing a first social media post, wherein the data representing the first social media post includes geographic location data identifying the first geographic location;
identify a plurality of candidate social media posts that are related to one or more of the social media posts represented by the dataset, wherein the candidate social media posts include a second social media post related to the first social media post;
access data representing the plurality of candidate social media posts including data representing the second social media post, wherein the data representing the plurality of candidate social media posts does not include geographic location data identifying the first geographic location;
analyze the data representing the plurality of candidate social media posts based at least in part on the dataset representative of social media posts identified as including geographic location data identifying the first geographic location, comprising:
analyze the data representing the second social media post, wherein the data representing the second social media post includes an image, and wherein analyzing the data representing the second social media post comprises:
applying a computer vision classification algorithm to the image of the data representing the second social media post to determine a first class confidence score;
if the first class confidence score for the image of the data representing the second social media post exceeds a threshold first class confidence score, classifying the image of the second social media post as matching the first class, wherein the location score is determined based at least in part on the classification of the image of the second social media post as matching the first class; and
if the first class confidence score for the image of the data representing the second social media post does not exceed the threshold first class confidence score, forgoing classifying the image of the second social media post as matching the first class;
determine a location score based at least in part on the analysis of the data representing the second social media post; and
if the location score for the data representing the second social media post exceeds a threshold location score, associate the second social media post with the first geographic location.

16. The non-transitory computer-readable storage medium claim of 15, wherein a first user account posted the first social media post, and wherein identifying the plurality of candidate social media posts that include the second social media post related to the first social media post comprises:
determining a window of time based on a time associated with the first social media post; and
identifying one or more social media posts posted by the first user account during the window of time, wherein the one or more social media posts posted by the first user account during the window of time includes the second social media post.

17. The non-transitory computer-readable storage medium of claim 15, wherein a first user account posted the first social media post, and wherein identifying the plurality of candidate social media posts that include the second social media post related to the first social media post comprises:
determining that a second user account is mentioned or tagged in the first social media post; and
identifying one or more social media posts posted by the second user account, wherein the one or more social media posts posted by the second user account includes the second social media post, and wherein the first and second user accounts are different.

18. The non-transitory computer-readable storage medium of claim 15, wherein identifying the plurality of candidate social media posts that include the second social media post related to the first social media post comprises:
determining that the first social media post includes a first tag; and identifying the second social media post based on the first tag, wherein the second social media post includes the first tag.

19. The non-transitory computer-readable storage medium of claim 15, wherein a first user account posted the first social media post, and wherein identifying the plurality of candidate social media posts that include the second social media post related to the first social media post comprises:
  determining that a third user account interacted with the first social media post; and
  identifying one or more social media posts posted by the third user account, wherein the one or more social media posts posted by the third user account includes the second social media post, and wherein the first and third user accounts are different.

20. The non-transitory computer-readable storage medium of claim 15, wherein identifying the plurality of candidate social media posts that include the second social media post related to the first social media post comprises:
  accessing a database of identifiers associated with users previously identified as likely to be located at the first geographic location;
  matching a fourth user account to an identifier in the database; and
  identifying one or more social media posts posted by the fourth user account, wherein the one or more social media posts posted by the fourth user account includes the second social media post.

21. The non-transitory computer-readable storage medium of claim 15, wherein analyzing the data representing the plurality of candidate social media posts that include the second social media post comprises:
  performing semantic analysis to determine a semantic similarity score between the second social media post and at least a portion of the dataset representative of social media posts identified as including geographic location data identifying the first geographic location;
  wherein the location score is determined based at least in part on the semantic similarity score.

22. The non-transitory computer-readable storage medium of claim 15, further comprising instructions, which, when executed by one or more processors of a system, cause the computing system to:
  if the location score for the data representing the second social media post exceeds the threshold location score, add the data representing the second social media post to the dataset representative of social media posts identified as including geographic location data identifying the first geographic location.

23. The non-transitory computer-readable storage medium of claim 15, wherein the computer vision classification algorithm includes one or more of: a nearest-neighbor classification algorithm and an artificial neural network classification algorithm.

24. The non-transitory computer-readable storage medium of claim 15, further comprising instructions, which, when executed by one or more processors of a system, cause the computing system to:
  if the location score for the data representing the second social media post exceeds the threshold location score, use the data representing the second social media post to update the computer vision classification algorithm.

25. The non-transitory computer-readable storage medium of claim 24, further comprising instructions, which, when executed by one or more processors of a system, cause the computing system to:
  access data representing a third social media post, wherein the data representing the third social media post does not include geographic location data identifying the first geographic location, and wherein the data representing the third social media post includes an image;
  apply the updated computer vision classification algorithm to the image of the data representing the third social media post.

26. The non-transitory computer-readable storage medium of claim 15, wherein the computer vision classification algorithm relies on at least one image that matches the first class and that is not associated with the first geographic location.

27. The non-transitory computer-readable storage medium of claim 15, further comprising instructions, which, when executed by one or more processors of a system, cause the computing system to:
  if the location score for the data representing the second social media post does not exceed the threshold location score, forgo associating the second social media post with the first geographic location.

28. The non-transitory computer-readable storage medium claim of 15, wherein the first geographic location is associated with an event, and wherein the non-transitory computer-readable storage medium further comprises instructions which, when executed by one or more processors of a system, cause the computing system to:
  during a time period associated with the event:
    identifying the plurality of candidate social media posts that are related to one or more of the social media posts represented by the dataset, wherein identifying the plurality of candidate social media post comprises identifying social media posts that were posted during the time period; and
    analyzing the data representing the plurality of candidate social media posts based at least in part on the dataset representative of social media posts identified as including geographic location data identifying the first geographic location.

29. A system for resolving geographic location of social media posts to determine if they are associated with a first geographic location, comprising:
  one or more processors;
  memory; and
  one or more programs, wherein the one or more programs are stored in the memory and configured to be executed by the one or more processors, the one or more programs including instructions for:
    accessing a dataset representative of social media posts identified as including geographic location data identifying the first geographic location, wherein the dataset includes data representing a first social media post, wherein the data representing the first social media post includes geographic location data identifying the first geographic location;
    identifying a plurality of candidate social media posts that are related to one or more of the social media posts represented by the dataset, wherein the candidate social media posts include a second social media post related to the first social media post;
    accessing data representing the plurality of candidate social media posts including data representing the second social media post, wherein the data representing the plurality of candidate social media posts does not include geographic location data identifying the first geographic location;

analyzing the data representing the plurality of candidate social media posts based at least in part on the dataset representative of social media posts identified as including geographic location data identifying the first geographic location, comprising:
   analyzing the data representing the second social media post, wherein the data representing the second social media post includes an image, and wherein analyzing the data representing the second social media post comprises:
      applying, by one or more processors, a computer vision classification algorithm to the image of the data representing the second social media post to determine a first class confidence score;
      if the first class confidence score for the image of the data representing the second social media post exceeds a threshold first class confidence score, classifying the image of the second social media post as matching the first class, wherein the location score is determined based at least in part on the classification of the image of the second social media post as matching the first class; and
      if the first class confidence score for the image of the data representing the second social media post does not exceed the threshold first class confidence score, forgoing classifying the image of the second social media post as matching the first class;
   determining a location score based at least in part on the analysis of the data representing the second social media post; and
   if the location score for the data representing the second social media post exceeds a threshold location score, associating the second social media post with the first geographic location.

30. The system according to claim 29, wherein the first geographic location is associated with an event, and wherein the one or more programs further include instructions for:
   during a time period associated with the event:
      identifying the plurality of candidate social media posts that are related to one or more of the social media posts represented by the dataset, wherein identifying the plurality of candidate social media post comprises identifying social media posts that were posted during the time period; and
      analyzing the data representing the plurality of candidate social media posts based at least in part on the dataset representative of social media posts identified as including geographic location data identifying the first geographic location.

31. The system according to claim 29, wherein a first user account posted the first social media post, and wherein identifying the plurality of candidate social media posts that include the second social media post related to the first social media post comprises:
   determining a window of time based on a time associated with the first social media post; and
   identifying one or more social media posts posted by the first user account during the window of time, wherein the one or more social media posts posted by the first user account during the window of time includes the second social media post.

32. The system according to claim 29, wherein a first user account posted the first social media post, and wherein identifying the plurality of candidate social media posts that include the second social media post related to the first social media post comprises:
   determining that a second user account is mentioned or tagged in the first social media post; and
   identifying one or more social media posts posted by the second user account, wherein the one or more social media posts posted by the second user account includes the second social media post, and wherein the first and second user accounts are different.

33. The system according to claim 29, wherein identifying the plurality of candidate social media posts that include the second social media post related to the first social media post comprises:
   determining that the first social media post includes a first tag; and
   identifying the second social media post based on the first tag, wherein the second social media post includes the first tag.

34. The system according to claim 29, wherein a first user account posted the first social media post, and wherein identifying the plurality of candidate social media posts that include the second social media post related to the first social media post comprises:
   determining that a third user account interacted with the first social media post; and
   identifying one or more social media posts posted by the third user account, wherein the one or more social media posts posted by the third user account includes the second social media post, and wherein the first and third user accounts are different.

35. The system according to claim 29, wherein identifying the plurality of candidate social media posts that include the second social media post related to the first social media post comprises:
   accessing a database of identifiers associated with users previously identified as likely to be located at the first geographic location;
   matching a fourth user account to an identifier in the database; and
   identifying one or more social media posts posted by the fourth user account, wherein the one or more social media posts posted by the fourth user account includes the second social media post.

36. The system according to claim 29, wherein the computer vision classification algorithm includes one or more of: a nearest-neighbor classification algorithm and an artificial neural network classification algorithm.

37. The system according to claim 29, the one or more programs further including instructions for:
   if the location score for the data representing the second social media post exceeds the threshold location score, using the data representing the second social media post to update the computer vision classification algorithm.

38. The system according to claim 37, the one or more programs further including instructions for:
   accessing, by one or more processors, data representing a third social media post, wherein the data representing the third social media post does not include geographic location data identifying the first geographic location, and wherein the data representing the third social media post includes an image;
   applying, by one or more processors, the updated computer vision classification algorithm to the image of the data representing the third social media post.

39. The system according to claim 29, wherein the computer vision classification algorithm relies on at least one image that matches the first class and that is not associated with the first geographic location.

* * * * *